US012506307B2

(12) United States Patent
Laurx et al.

(10) Patent No.: US 12,506,307 B2
(45) Date of Patent: Dec. 23, 2025

(54) HIGH-SPEED, HERMAPHRODITIC CONNECTOR AND CONNECTOR ASSEMBLIES

(71) Applicant: MOLEX, LLC, Lisle, IL (US)

(72) Inventors: John C. Laurx, Aurora, IL (US); Khang Choong Yong, Selangor (MY); Michael Rost, Lisle, IL (US); Pue Xie, Naperville, IL (US)

(73) Assignee: MOLEX, LLC, Lisle, IL (US)

( * ) Notice: Subject to any disclaimer, the term of this patent is extended or adjusted under 35 U.S.C. 154(b) by 328 days.

(21) Appl. No.: 18/031,890

(22) PCT Filed: Dec. 10, 2021

(86) PCT No.: PCT/IB2021/061576
§ 371 (c)(1),
(2) Date: Apr. 14, 2023

(87) PCT Pub. No.: WO2022/123523
PCT Pub. Date: Jun. 16, 2022

(65) Prior Publication Data

US 2023/0396030 A1 Dec. 7, 2023

Related U.S. Application Data

(60) Provisional application No. 63/123,486, filed on Dec. 10, 2020.

(51) Int. Cl.
*H01R 13/28* (2006.01)
*H01R 13/631* (2006.01)
(Continued)

(52) U.S. Cl.
CPC ............. *H01R 24/84* (2013.01); *H01R 13/28* (2013.01); *H01R 13/631* (2013.01); *H01R 13/64* (2013.01); *H01R 13/6592* (2013.01)

(58) Field of Classification Search
None
See application file for complete search history.

(56) References Cited

U.S. PATENT DOCUMENTS 3,091,746 A * 5/1963 Winkler ................ H01R 13/28 439/744
3,467,942 A * 9/1969 Stoyer .................. H01R 13/432 439/293
(Continued)

FOREIGN PATENT DOCUMENTS

EP 0694998 A2 1/1996
JP H1099581 A 7/1998
(Continued)

OTHER PUBLICATIONS

International Search Report and Written Opinion received for PCT Application No. PCT/IB2021/061576, mailed on May 25, 2022, 15 pages.

(Continued)

*Primary Examiner* — Tho D Ta
(74) *Attorney, Agent, or Firm* — Perilla Knox & Hildebrandt LLP; Kenneth A. Knox

(57) ABSTRACT

High-speed, hermaphroditic electrical connectors may be connected to form a hermaphroditic connector assembly that uses less space than existing connector assemblies. A housing can provide a first and second engagement feature that are intended to engage each other so that when two such connectors are rotated 180 degrees the engagement features allow two such connectors to mate together. Cables can be connected directly to the terminals so as to provide for improved electrical performance.

23 Claims, 19 Drawing Sheets

(51) Int. Cl.

| | |
|---|---|
| ***H01R 13/64*** | (2006.01) |
| ***H01R 13/6592*** | (2011.01) |
| ***H01R 24/84*** | (2011.01) |

(56) References Cited

U.S. PATENT DOCUMENTS

| | | | | |
|---|---|---|---|---|
| 3,909,099 | A * | 9/1975 | Winkler | H01R 24/84 439/295 |
| 4,083,617 | A * | 4/1978 | Wyatt | H01R 13/533 439/744 |
| 4,737,118 | A | 4/1988 | Lockard | |
| 4,990,099 | A * | 2/1991 | Marin | H01R 13/642 439/221 |
| 5,308,258 | A * | 5/1994 | Hatsios | H01R 24/84 439/465 |
| 5,800,196 | A * | 9/1998 | Rudoy | H01R 24/84 439/284 |
| 6,109,938 | A * | 8/2000 | Meslet | H01R 13/453 439/376 |
| 8,449,329 | B1 | 5/2013 | Schroll | |
| 9,634,417 | B2 * | 4/2017 | Ramanna | H01R 13/432 |
| 2014/0017940 | A1 | 1/2014 | Chen et al. | |
| 2018/0301842 | A1 * | 10/2018 | Somanathapura Ramanna | H01R 13/28 |
| 2020/0021069 | A1 * | 1/2020 | Sabo | H01R 24/84 |
| 2020/0067225 | A1 | 2/2020 | Rossman et al. | |

FOREIGN PATENT DOCUMENTS

| | | | |
|---|---|---|---|
| JP | 2012059516 | A | 3/2012 |
| JP | 2014154555 | A | 8/2014 |
| JP | 2016511528 | A | 4/2016 |
| JP | 2018536261 | A | 12/2018 |
| JP | 2018536267 | A | 12/2018 |
| TW | M251376 | U | 11/2004 |
| TW | M339103 | U | 8/2008 |

OTHER PUBLICATIONS

International Preliminary Report on Patentability and Written Opinion received for PCT Application No. PCT/IB2021/061576, mailed on Jun. 22, 2023, 10 pages.

* cited by examiner

HIGH-SPEED, HERMAPHRODITIC CONNECTOR AND CONNECTOR ASSEMBLIES

CROSS-REFERENCE TO RELATED APPLICATION

This application is a national phase of PCT/IB2021/061576, filed on Dec. 10, 2021, which claims priority to U.S. Provisional Application 63/123,486, filed Dec. 10, 2020 ("'486 Application"), both of which is are incorporated herein by reference in its their entirety entireties.

TECHNICAL FIELD

This disclosure relates to the field of connectors, more specifically to hermaphroditic connectors and assemblies suitable for use in high-data rate applications.

INTRODUCTION

Evolving telecommunication systems and network architectures desire electronic chip-to-chip interconnections that are capable of supporting higher density and higher bandwidths (while meeting signal integrity requirements) with increased flexibility and lower cost. Existing copper-based interconnections (e.g., connectors) sometimes suffer from substantial printed circuit board (PCB) signal losses (e.g., when electrical signals must travel over traces embedded in a PCB or similar substrate. Accordingly, it is desirable to provide connectors that address the shortcomings of existing interconnections.

SUMMARY

In an embodiment, one or more hermaphroditic connectors may be provided to address and overcome some of the shortcomings of existing connectors, where two such hermaphroditic connectors may be connected to form a hermaphroditic connector assembly.

In more detail, a first connector may comprise a first housing configured to receive a plurality of wafers, with each wafer supporting a plurality of cables. Further, the first connector may comprise a first and second engagement feature, where the first engagement feature is configured to mate with the second engagement feature. In an embodiment, a first connector may be configured to mate with a second connector that is substantially the same as the first connector but with the orientation of the first connector being 180 degrees different than the second connector. In an embodiment, the first engagement feature may be configured as a T-shaped rib while the second engagement feature may be configured as a T-shaped, slot.

The housing may further comprise additional engagement features to hold the first and second connectors together, it being understood that additional engagement features will typically be added in pairs so that, for example, a third engagement feature can engage a fourth engagement feature when the first and second connectors are mated together. In on embodiment, the third engagement feature will be a shroud and the fourth engagement feature will insert into the shroud.

The exemplary first connector may further comprise one or more shields, each shield configured as an electrical ground and may be further configured to electromagnetically protect high-speed, differential electrical signals being transmitted by terminals. Each of the one or more shields of the first connector may be further configured to structurally support the terminals.

In an embodiment, each of the one or more shields of the first connector: (i) may be configured as a U-shaped shield; (ii) may comprise an opening for receiving solder or another connection material to connect a grounding structure (e.g., a flat drain foil) of a cable (e.g., twinax cable) to a respective shield to form a ground path; (iii) may comprise one or more openings, each opening configured to receive a protrusion of a dielectric component to connect the dielectric component to a respective shield; and (iv) may comprise an electromagnetically shielded and electrically grounded wall and electromagnetically shielded and electrically grounded sidewalls, wherein the sidewalls of a respective shield comprise ends configured to electrically connect a grounding structure of a cable to the respective shield, and wherein the ends of a respective shield may be configured inwardly towards the grounding structure of the cable to provide a surface at which a respective shield is electrically bonded to the grounding structure of the cable and to protect the connection of an electrically conductive tail and conductor from unwanted electromagnetic signals, In an embodiment, the first connector may further comprise one or more electrical grounding collars, each collar configured to connect to a grounding structure of a cable and to ends of a respective shield to form a ground path. Such a grounding collar may be a separate component or may be integral with a shield to connect a respective shield to a grounding structure of the cable, forming a ground path.

In another embodiment, the first connector may further comprise one or more electrical grounding collars, each collar configured to be connected to a respective shield of the first connector and to a grounding structure (e.g., flat drain foil) of a cable. Each collar may be further configured to provide an electromagnetic, protective canopy over a connection of respective conductive, electronic tails to conductors of the cable ("conductors" for short) to reduce unwanted crosstalk and control an impedance of the connection. Each collar may comprise one or more integral, indentations and the respective shield may comprise one or more integral, inward protrusions to connect the collar to the shield.

In still another embodiment, each of the one or more shields of a first connector may comprise retaining arms that may be configured to contact dual, side ground drain wires of a cable to form a ground path.

Alternatively, each of the shields may comprise an opening to provide access to the conductor termination to the tails of the contacts. In such an embodiment, a first connector may further comprise one or more conductive, micro-clamps (e.g., composed of a conductive plated plastic), each micro-clamp positioned over an opening in an adjacent shield to reduce or mitigate unwanted cross-talk therebetween. Each of the micro-clamps may be configured to compress dual, side ground drain wires of a cable onto integral tabs of one of the one or more shields to form a ground path. Optionally, each of the micro-clamps may comprise a latch mechanism to allow respective, connected tails and respective, conductors to be accessed, for example. In some embodiments a micro-clamp can be configured to extend across and engage multiple shields.

In addition to shields, each of the one or more hermaphroditic connectors (e.g., the first connector) may further comprise conductive structures, where each conductive structure may comprise a respective internal conductor on one end and a respective electrically conductive tail on an opposite end, where each respective internal conductor may comprise an end formed to apply a frictional force when the conductor contacts an internal conductor of the second hermaphroditic connector to form connected, high-speed signal paths.

Each of the one or more shields of the first connector may comprise a main wall, sidewalls, ends or spring fingers that may make contact with a recess in a shield of the second connector to form an electrical ground path between the first and second connectors and to protect a connection between the first and second connector from unwanted electromagnetic signals.

In an embodiment, the housing mentioned previously may comprise a plurality of pockets, each pocket configured to hold and support one of the one or more shields and terminals, and wherein each pocket may be further configured to provide open space, filled with air, that functions as a way to lower the dielectric constant to reduce potential crosstalk between adjacent terminals. The pockets can be provided in a row in the housing.

In further embodiments, each of the one or more shields may comprise flexible, conductive fingers that may electromagnetically shield at least terminals and may be configured as an electrical ground.

In an embodiment, each tail of a conductive structure may be configured to connect to a conductor to enable transmission of high-speed electrical signals (e.g., 112 Gbps, or between 112 Gbps and 224 Gbps). Further, each of the tails may be configured with one or more undulated edges comprising one or more dentations, where (i) a width of each tail may vary along a connected length where a tail is connected to a conductor to control an impedance of the connection of the tail and conductor and to avoid unwanted electrical crosstalk; (ii) each tail may comprise one or more peak portions and one or more valley portions to connect the tail to the conductor; (iii) a width of a valley portion may differ from one valley portion to another valley portion and a width of a peak portion may vary from one peak portion to another peak portion by 10% or 20%; and (iv) each undulated edge may be rounded, rectangular, diamond-shaped, or another shape that improves the connection of a respective tail to a respective conductor. Still further, one or more of the peak portions may be configured to guide a conductor onto a tail. In more detail, one or more of the peak portions may be configured as a hook to guide the conductor onto the tail.

It should be understood that the first connector may be connected to the second hermaphroditic connector, wherein the connected first and second hermaphroditic connectors may comprise a hermaphroditic connector assembly.

BRIEF DESCRIPTION OF THE DRAWINGS

The present disclosure is illustrated by way of example and not limited to the accompanying figures in which like reference numerals may refer to similar elements and in which.

DETAILED DESCRIPTION, INCLUDING EXEMPLARY EMBODIMENTS

Figure 1:
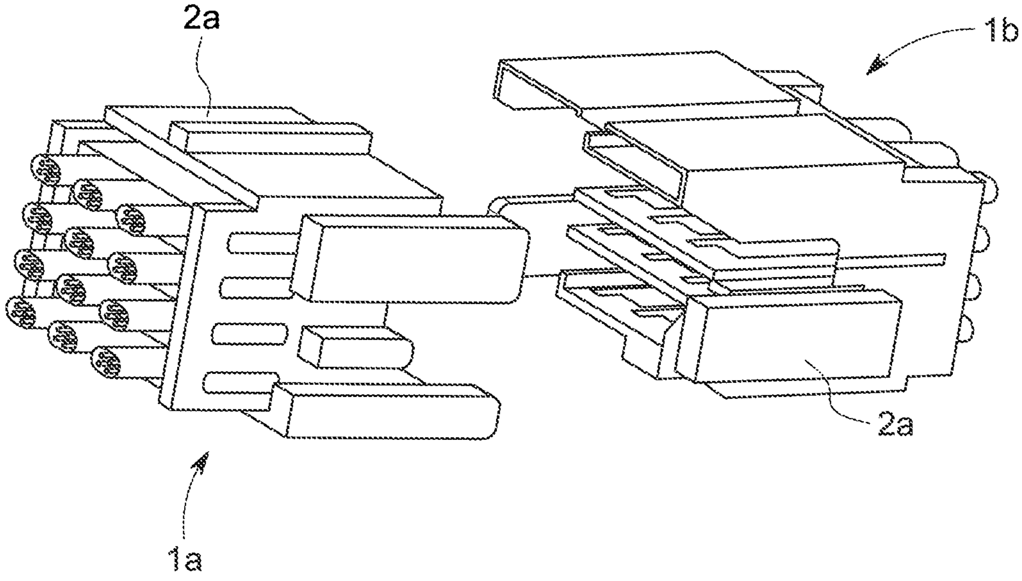
FIG. 1 illustrates an isometric view of an exemplary hermaphroditic, high density, high bandwidth connector system in an unmated condition.
Figure 2:
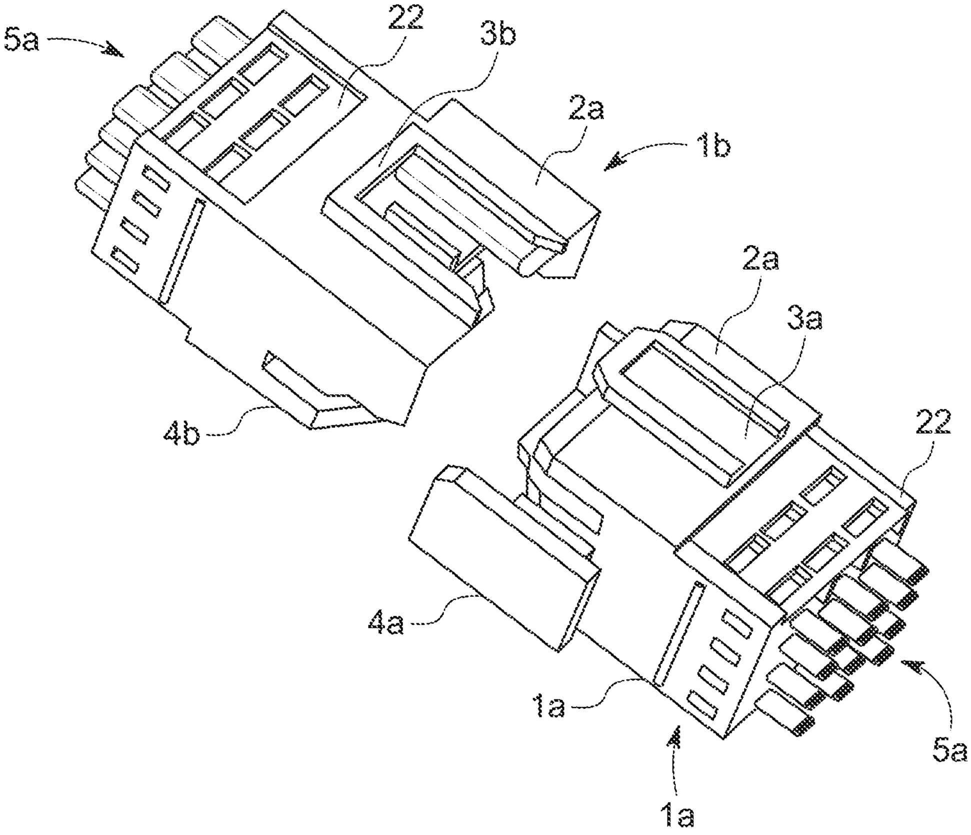
FIG. 2 illustrates another isometric view of the embodiment depicted in FIG. 1.

Simplicity and clarity in both illustration and description are sought to effectively enable a person of skill in the art to make, use, and best practice embodiments disclosed herein in view of what is already known in the art. One skilled in the art will appreciate that various modifications and changes may be made to the specific embodiments described herein without departing from the spirit and scope of the disclosure. Thus, the specification and drawings are to be regarded as illustrative and exemplary rather than restrictive or all-encompassing, and all such modifications to the specific embodiments described herein are intended to be included within the scope of the disclosure. Yet further, unless otherwise noted, features disclosed herein may be combined together to form additional combinations that were not otherwise described or shown for purposes of brevity.

It should also be noted that one or more exemplary embodiments may be described as a method or process. Although a method or process may be described as an exemplary sequence (i.e., sequential), unless otherwise noted the steps in the sequence may also be performed in parallel, concurrently or simultaneously. In addition, the order of each formative step within a method or process may be re-arranged. A described method or process may be terminated when completed, and may also include additional steps that are not described herein if, for example, such steps are known by those skilled in the art.

As used herein the terms "high-speed" and "high-data rate" may be used interchangeably. As used herein, the term "embodiment" or "exemplary" mean an example that falls within the scope of the disclosure. Substantially similar, when referring to a first and second connector, means that both connectors are close enough to being identical so as to allow each other to mate together and form a hermaphroditic connector assembly.

FIGS. 1 to 6 illustrate embodiments of exemplary hermaphroditic connectors 1*a* and 1*b* that may, among other things, provide increased flexibility and lower cost when compared to existing connectors, while also potentially increasing density and supporting higher data rates. When connected together, the two connectors 1*a* and 1*b* may be referred to as a hermaphroditic connector assembly 1*c*, for example (see FIG. 5). As shown, each connector 1*a*, 1*b* is substantially the same and may comprise a respective housing 2*a* that can be formed of an insulative material configured to receive a plurality of electrical or electronic, conductive cables 5*a* (e.g., twinax cables) and to connect each cable to enclosed and protected internal conductive components. Though each connector 1*a*, 1*b* is shown as receiving respective electrical cables 5*a*, the tails that will be discussed below could be amended to terminate into a substrate rather than terminate to conductors in cables. Said another way, FIGS. 1 to 4 illustrate embodiments of the connector system connected to cables.

As can be appreciated, each of the connectors 1*a*, 1*b* supports a plurality of wafers 22 that are inserted into the housing 2*a*. The wafers 22 can be formed by overmolding a portion of one or more cables 5*a* and an associated shield/terminal so to support the components within the housing 2*a* and to provide strain relief for the cables 5*a*. It should be noted that while the cables for both connectors can be the same, such uniform construction of the cables is not required and different cables can be used for both connectors, as desired.

For ease of reference cables received by connector 1*a* may be referred to herein as a "first" plurality of cables while cables received by connector 1*b* 5*b* may be referred to herein as a "second" plurality of cables.

Each connector 1*a*, 1*b* may comprise one or more, respective, engagement features formed as a part of (i.e., integral to) a respective housing 2*a*. FIG. 1 illustrates a first embodiment that includes a simple protrusion and corresponding slot while FIGS. 2-6 illustrate a second embodiment. Though using one first engagement feature and one second engagement feature for each housing is depicted, it should be understood that this is exemplary and additional engagement features can be provided as desired. In more detail, in one embodiment the housing 2*a* of connector 1*a* (sometimes referred to as a "first" housing) may comprise a first engagement feature 3*a* that may be configured to be mate with a corresponding second engagement feature 3*b* of housing 2*a* of the connector 1*b* (sometimes referred to as a "second" housing). Further, a second engagement feature 4*a* of connector 1*a* may be configured to be shaped to mate with the first engagement feature 4*b* of connector 1*b* (see FIGS. 2-6). The combination of engagement features 4*a* and 4*b* can collectively provide an engagement arrangement 4*ab* that allows the mated connector to provide a shroud around the contact area. As can be appreciated, therefore, each connector can have a first engagement feature and a second engagement feature that are configured to respectively engage the second and first engagement features of a mating connector.

As shown in FIGS. 1 to 6 the first engagement features 3*a* may be configured as "T"-shaped ribs while the second engagement features 3*b* may be configured as "T"-shaped slots, for example. It should be understood, however, that the T shaped rib and slot are merely illustrative and other shapes may be used to align and connect one connector to another. In an embodiment, to align and connect the connectors 1*a*, 1*b*, a respective T-shaped rib 3*a* may be inserted into a respective T-shaped slot 3*b*.

Further, the respective ribs and slots also align respective terminals 7*a* of respective connectors 1*a*, 1*b* in order to allow high-speed electrical signals (e.g., 112 Gbps) to be transported or conducted from cable to cable, as will be described in more detail elsewhere herein. As can be appreciated, for each connector, the first and second engagement features may be positioned on opposite sides of the respective connector so that two such connectors can mate with each other when properly orientated.

Figure 3:
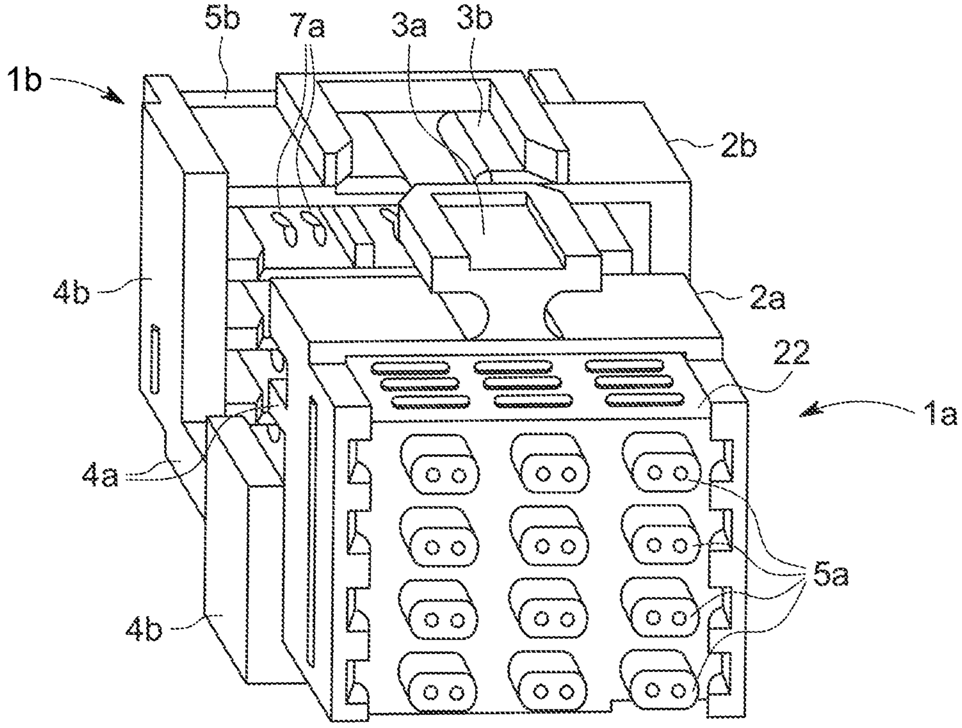
FIG. 3 illustrates another isometric view of the connector system depicted in FIG. 1.
Figure 4:
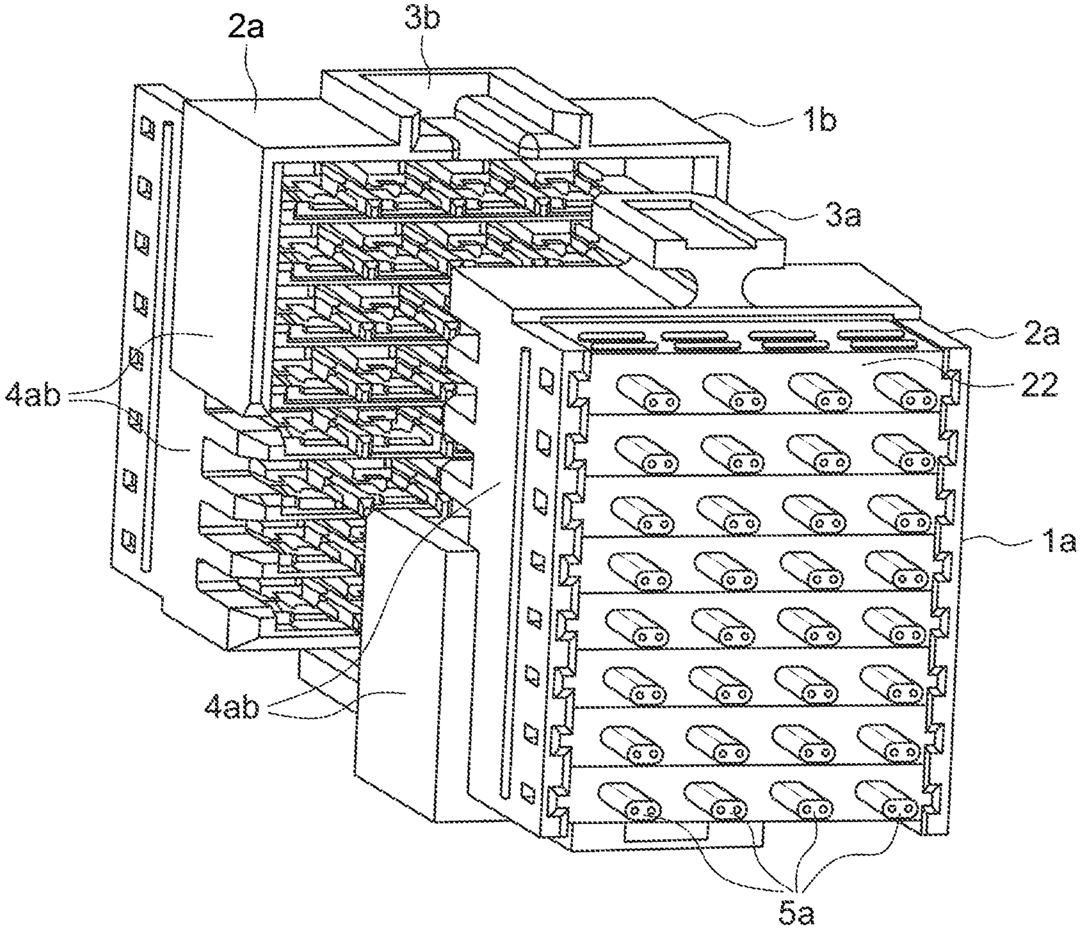
FIG. 4 illustrates another isometric view of the connector system depicted in FIG. 1.
Figure 5:
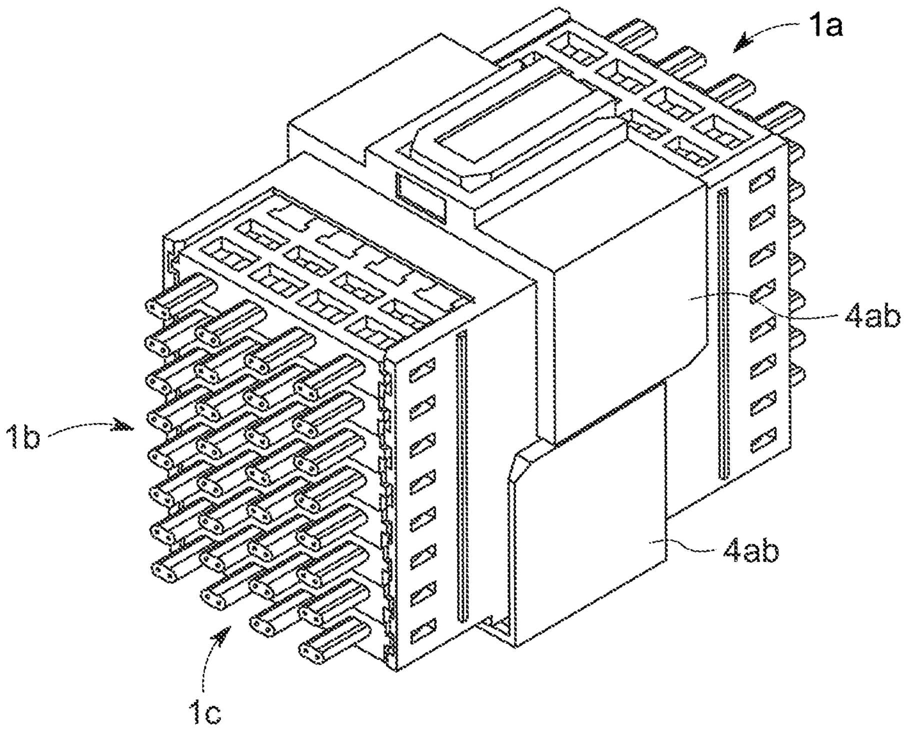
FIG. 5 depicts an isometric view of the connector system depicted in FIG. 1 but with in a mated condition.
Figure 6:
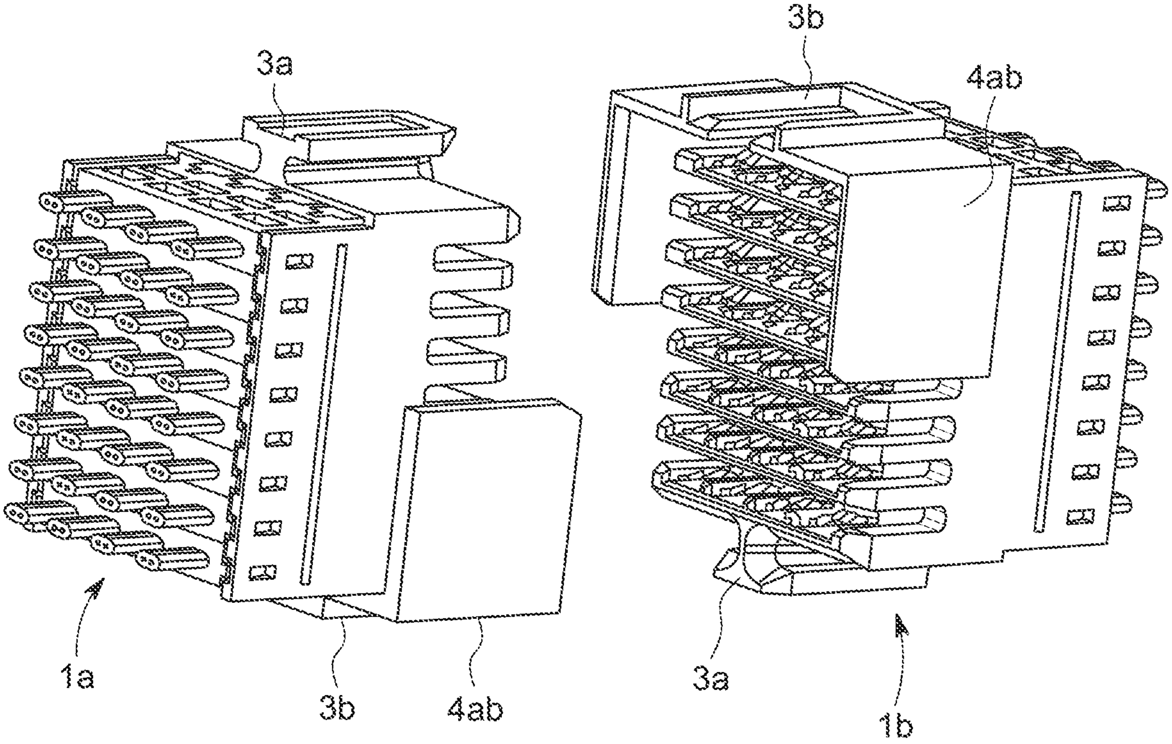
FIG. 6 illustrates two exemplary hermaphroditic, high density, high bandwidth connectors that may be configured to form an exemplary connector assembly.

Because each connector 1*a*, 1*b* has both first and second engagement features and two such connectors can be mated together, such connectors may be referred to as hermaphroditic connectors. FIGS. 3 and 4 also show additional engagement features 4*a*, 4*b* that collectively form engagement feature set 4*ab* that may be integral with a respective housing 2*a* and help align and control mating of two connectors. As can be appreciated from FIG. 4, both connectors can be identical but merely rotated 180 degrees so that that they can mate to each other.

As depicted, the engagement features 4*a*, 4*b* are provided on opposite sides so that when two connectors are mated together, a completely protected mating interface can be provided. Thus, the engagement feature 4*a* may fit into the engagement feature 4*b*.

Figure 7:
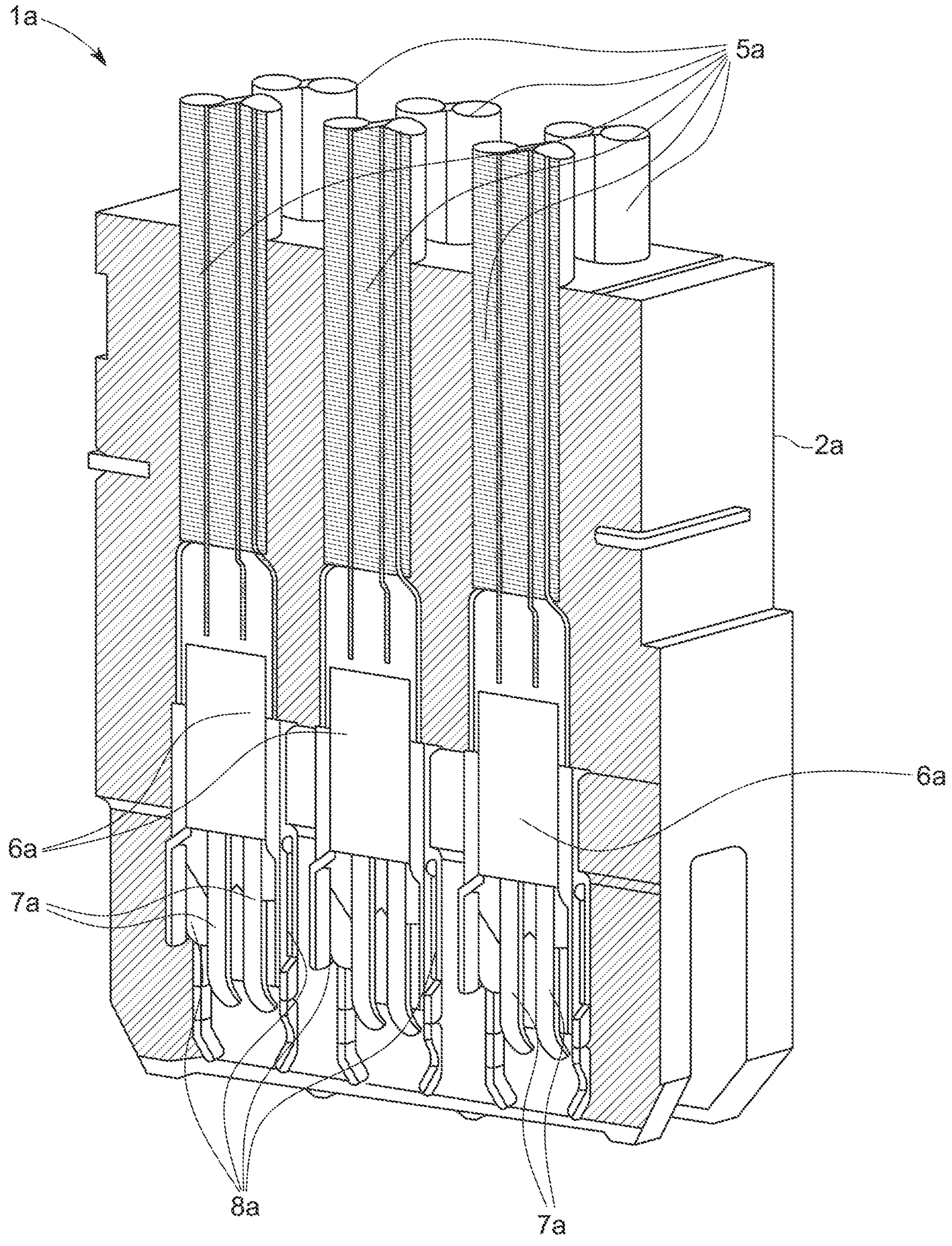
FIG. 7 depicts an isometric cross-sectional view of an exemplary hermaphroditic connector.

Referring to FIG. 7, there is depicted an exemplary cross-sectional view of a section of the exemplary connector 1*a*. From this view it can be seen that each exemplary connector may comprise one or more electrically grounded, shields 8*a*, which can be formed of a desirable alloy, often copper-based, where each shield 8*a* is configured to function as an electrical ground to provide a ground path for common mode energy and is further configured to shield the high-speed differential signals being transmitted by corresponding internal, terminals 7*a* within each shield 8*a* from unwanted electromagnetic signals (e.g., radio frequency (RF) signals). Still further, each shield 8*a* may additionally be configured to structurally support respective terminals 7*a* and chicklet 6*a* that may be positioned within the walls of each shield 8*a*.

Figure 8:
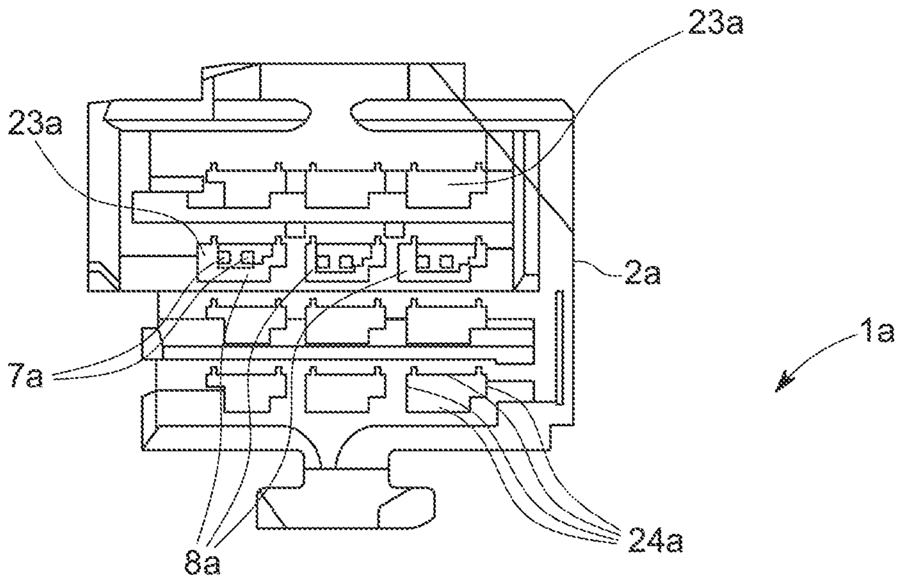
FIG. 8 depicts a simplified isometric view of a housing of an exemplary hermaphroditic connector.

Referring now to FIG. 8 there is depicted a simplified view of a plurality of respective shields 8*a* and their respective terminals 7*a*, each positioned within one of a plurality of respective openings or "pockets" 23*a* formed by respective walls 24*a* (e.g., four walls) of housing 2*a*. As shown the housing 2*a* may comprise a plurality of pockets 23*a*, each pocket configured to hold and support a respective shield 8*a* and terminals 7*a*, for example, and the pockets 23*a* can be aligned in one or more rows with each row in the housing configured to accept the wafer 22.

In an embodiment, a set of walls 24*a* may support and align a respective shield 8*a* and terminals 7*a* and separate each of the respective shields 8*a* and conductors 7*a* from other shields and conductors of the same connector 1*a*, for example. Further, in an embodiment, each formed pocket 23*a* may be configured to provide a region of air on one or more sides of the shield and the region of air can help modify the dielectric constant of the connector system to help improve signal integrity.

Figure 9:
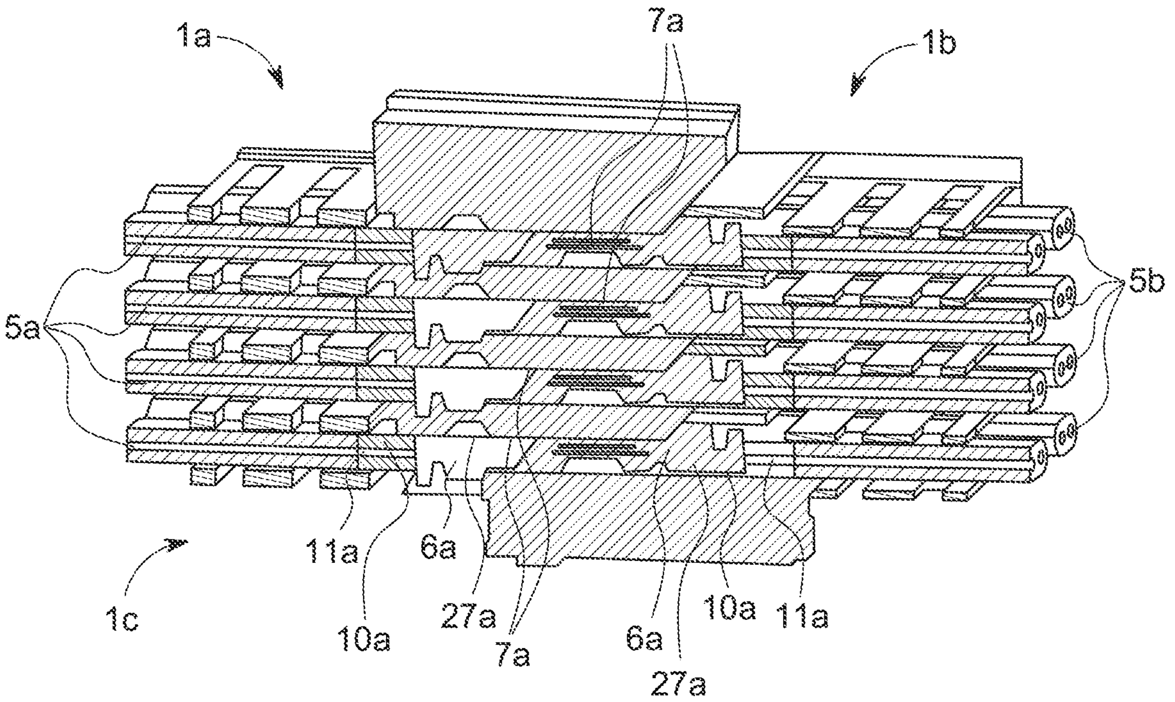
FIG. 9 depicts an isometric cross-sectional view of the connection of exemplary hermaphroditic connectors.

FIG. 9 depicts a simplified cross-sectional view of the connection of connectors 1*a*, 1 *b* illustrating, among other things, that each respective connector 1*a*, 1*b* may be configured with pairs of terminals 7*a* which can be identical but in opposite orientation in each connector so that they can be mated together. As can be appreciated, each tail 10*a* on an end of the terminals 7*a*. In embodiments, each respective tail 10*a* of connector 1*a* may be connected to an conductor 11*a* of a cable 5*a* (hereafter "cable" conductor) that may transport a high-speed differential signal and each respective tail 10*b* of connector 1*b* may be connected to a conductor 11*b* of cable 5*b* that may transport a high-speed differential signal, Further, a respective terminal 7*a* of connector 1*a* may be connected to a respective terminal 7*a* of connector 1*b* when the connectors 1*a*, 1*b* are so connected to form a hermaphroditic assembly 1*c*.

Figure 10:
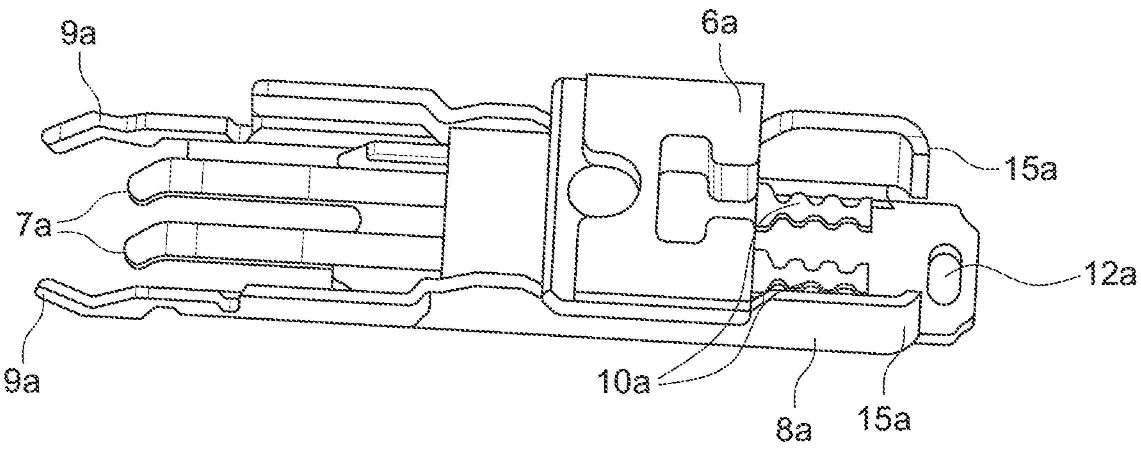
FIGS. 10 and 11 depict enlarged isometric views of an exemplary shield and some of the components protected and supported by the shield.
Figure 11:
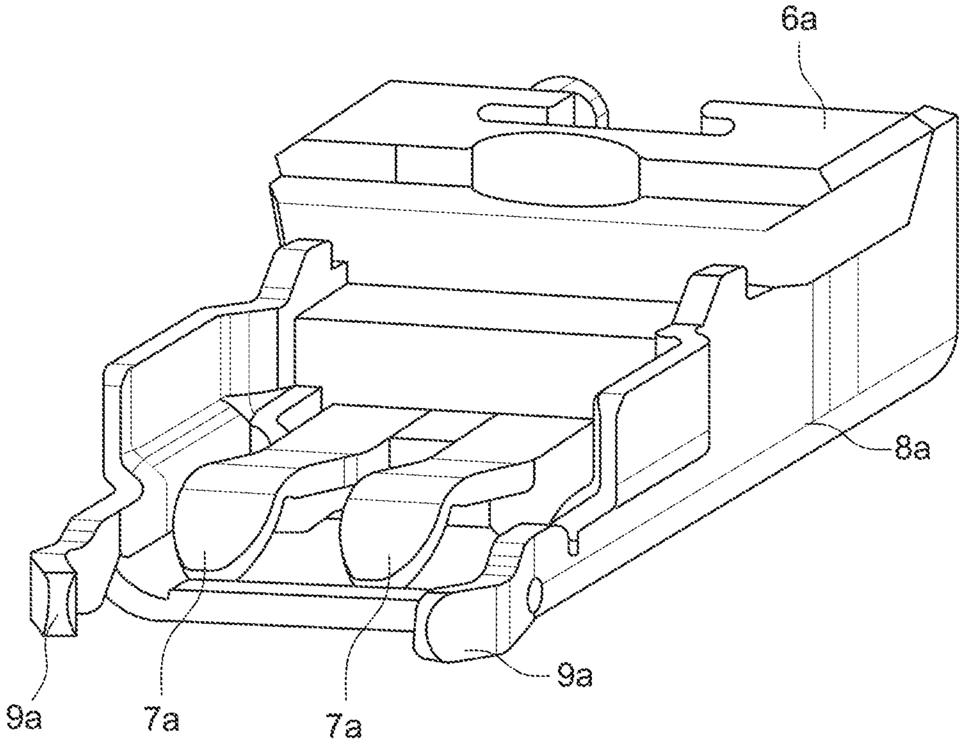

Referring now to FIGS. 10 and 11 there is depicted enlarged views of an exemplary shield 8*a* and the components it may protect and support. In an embodiment, each shield 8*a* of connector 1*a* may be configured as a U-shaped shield to help support and protect the respective terminals 7*a* and chicklet 6*a*.

In an embodiment, the terminals 7*a* may be supported by the respective shield 8*a* by mounting the chicklet 6*a* (which can also be referred to as a terminal housing 6*a*) to the shield 8*a*. Further, each terminal 7*a* may comprise a contact portion with end that is formed in an "elbow" shape (i.e., bent) in order to allow mating terminals 7*a* to engage each other without stubbing and to form a connected, high-speed signal path.

Each shield 8*a* may comprise fingers 9*a*, which can be flexible and can help shield at least conductors 7*a* when a connection is formed when the conductors 7*a* of one connector (e.g., connector 1*a*) are positioned to make physical contact with conductors (e.g., conductors 7*b*) of another connector (e.g., connector 1*b*; see FIGS. 9 and 32 to 34). The fingers 9*a* may also be configured as an electrical grounding structure to provide a grounding path (see FIG. 33). For example, in an embodiment, the respective fingers 9*a* of connector 1*a* may comprise flexible structures configured to make contact with the recess 29 of the shield 8*a* in a mating connector (e.g., connector 1*b*) to form (and maintain) an electrical grounding path (see FIGS. 33 and 34). Such a connection may occur when connector 1*a* is connected to connector 1*b* to form a hermaphroditic assembly 1*c* (see FIGS. 5 and 9, for example).

Figure 12:
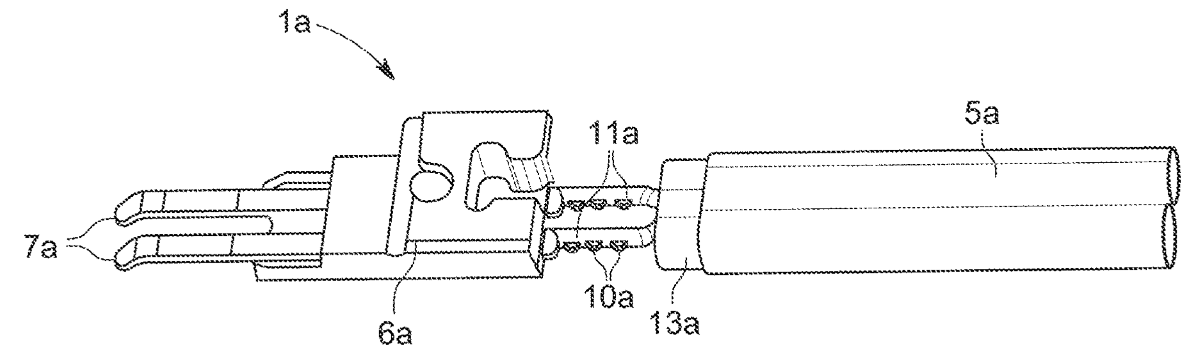
FIG. 12 illustrates an isometric simplified view of the exemplary connection of tails to conductors (e.g., high-speed, (112 gigabits per second (Gbps) to 224 Gbps) differential twinax conductors) of a cable.
Figure 13:
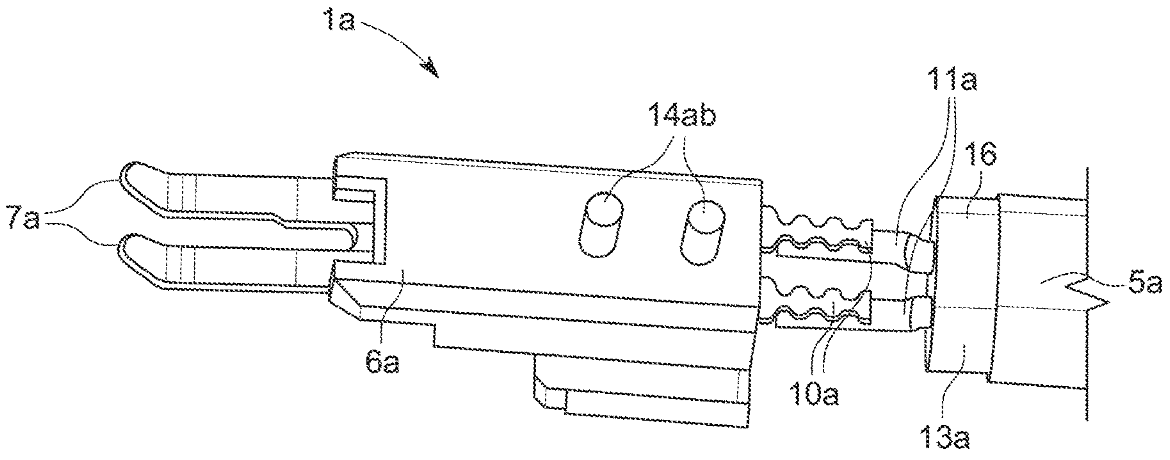
FIG. 13 illustrates another isometric view of the embodiment depicted in FIG. 12.

FIGS. 12 and 13 depict simplified views of the connection of one set of exemplary tails 10*a* of connector 1*a* to one set of conductors 11*a* (e.g., high-speed, differential twinax conductors) of cable 5*a*. FIG. 12 depicts a top view of such connections and FIG. 13 depicts a bottom view of the same connections. In both FIGS. 12 and 13 the shield 8*a* (that may protect the internal terminals 7*a*, chicklet 6*a*, and the connection between tails 10*a* and conductor 11*a*) is not shown to allow the reader to see the internal features, though it should be understood that a shield 8*a* is utilized in these embodiments (see FIG. 14). As shown, tails 10*a* may be positioned on an opposite end of the shield 8*a* from the terminals 7*a*. As can be further appreciated, the cable 5*a* includes a shielding layer 13*a* and a flat drain wire 16, it being understood that other configurations of twin-ax cable can be used and are discussed below.

Though only one shield 8*a*, one set of terminals 7*a* and one cable 5*a* comprising conductors 11*a* are shown, it should be understood that each shield 8*a*, each terminals 7*a* and each cable 5*a*/conductor 11*a* making up, or connected to, connector 1*a* may be illustrated in a similar fashion.

Continuing, in an embodiment an exemplary cable 5*a* may form a connection with connector 1*a* to transport high-speed, differential signals when its respective conductors 11*a* are connected to respective tails 10*a* of connector 1*a* by a welding process, for example. In an embodiment, one conductor 11*a* may be overlapped and connected to one tail 10*a* (or-vice versa), for example, to insure the high-speed electrical signals transported on conductors 11*a* (e.g., 112 Gbps signals, signals between 112 Gbps and 224 Gbps) may continue to be transported through tails 10*a* and, eventually on to terminals 7*a*. As noted previously, each conductive tail 10*a* of connector 1*a* may be one end of a conductive structure 27*a* that also comprises an internal conductor 7*a* (see FIG. 9).

In addition to connecting the differential, high-speed signal conductors 11*a* to tails 10*a* of connector 1*a*, a shielding layer of the cable 5*a* may also be connected to the connector 1*a*. For example, referring to FIG. 14 there is depicted a shield 8*a* that may comprise an opening 12*a* for receiving solder or another connection material 12*ab* to connect the shielding layer 13*a* and the drain wire 16 of a cable 5*a* (e.g., a differential, high-speed signal cable) to the shield 8*a* to form a ground path and electrically connect the drain wire, the shield and the shielding layer together.

Figure 14:
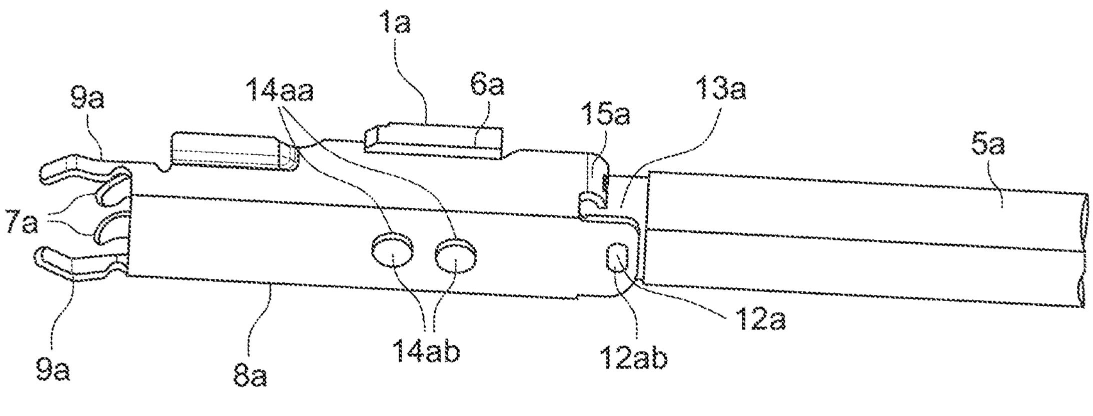
FIG. 14 illustrates an example of how an shield may support the embodiment depicted in FIG. 13, among other features.

FIG. 14 also illustrates an example of how an exemplary shield 8*a* may support the chicklet 6*a*. In an embodiment, the shield 8*a* may comprise one or more openings 14*aa*, each opening configured to receive a protrusion 14*ab* of the chicklet 6*a* in order to connect the chicklet 6*a* to the shield 8*a*, thereby fixing the chicklet 6*a* to the shield 8*a* in order to provide structural support and stability to the chicklet 6*a*.

Figure 15:
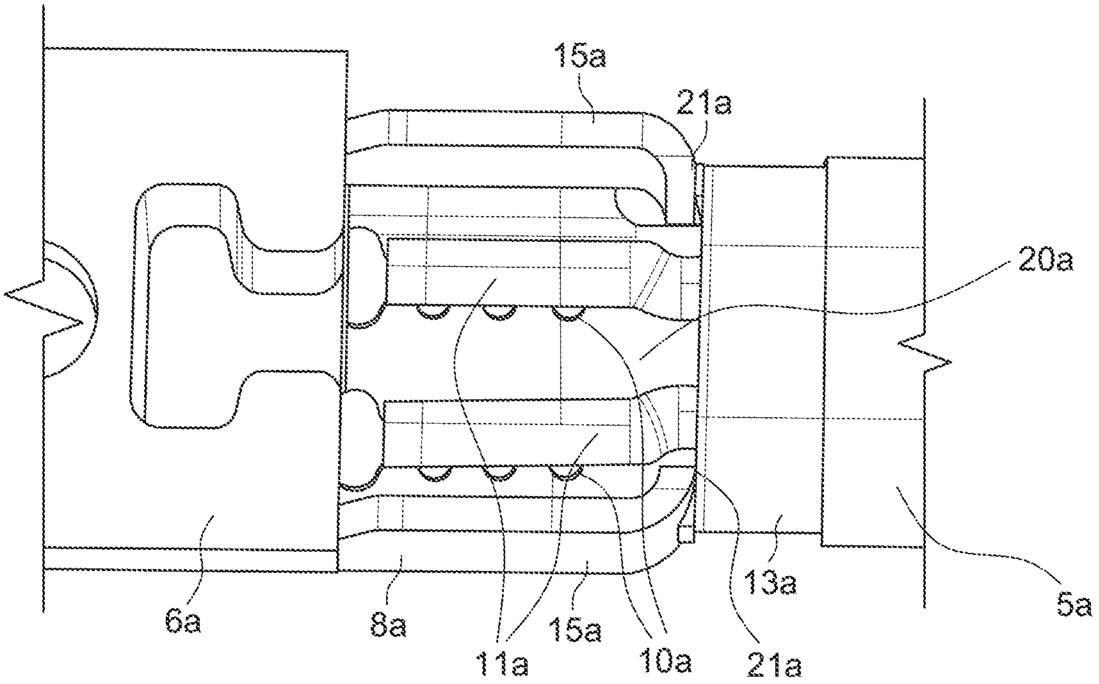
FIG. 15 depicts an isometric view of tails connected to conductors of a twin-ax cable in combination with an embodiment of a shield.

FIG. 15 depicts an enlarged view of a connection of exemplary tails 10*a* to conductors 11*a*. As shown, the overlapped, connected tails 10*a* and conductors 11*a* may be positioned within a main wall 20*a* (shown underneath conductors 11*a* in FIG. 15) and sidewalls of shield 8*a*.

In the embodiment depicted in FIG. 15 the sidewalls 15*a* may include respective ends 21*a* configured to electrically connect the shieling layer 13*a* of cable 5*a* to the shield 8*a*. Further, the ends 21*a* may be configured inwardly (i.e., bent towards the shielding layer 13*a* of the cable 5*a*) though this is merely exemplary. The inwardly formed ends 21*a* of sidewalls 15*a* may provide surfaces (troughs) at which the shield 8*a* may be electrically bonded (e.g., via solder or conductive adhesive) to the shielding layer 13*a* of the cable 5*a*. Such a configuration allows the sidewalls 15*a* and wall 20*a* to help provide a transition from the common mode coupling between the conductors 10*a* and the shielding layer 13*a* to the common mode coupling between the terminals 7*a* and the shield 8*a* while also providing shielding to reduce potential crosstalk from adjacent terminals.

Figure 16:
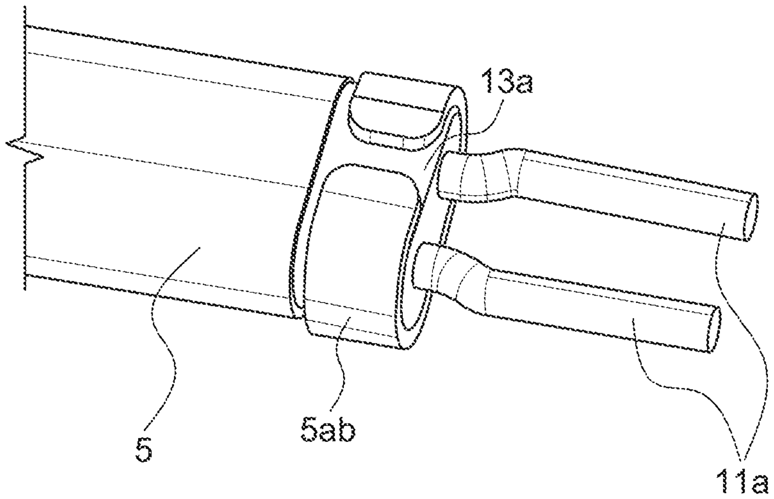
FIG. 16 illustrates a simplified isometric view of an alternative embodiment of a structure that can be used to connect to a shielding layer on a twin-ax cable.
Figure 17:
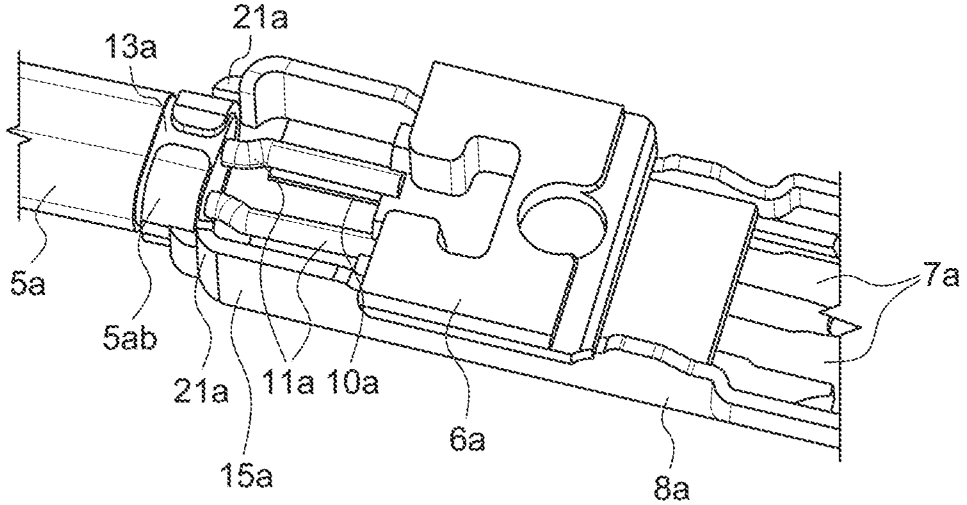
FIG. 17 illustrates an isometric view of the structure depicted in FIG. 16 showing an embodiment of a cable to terminal arrangement.
Figure 18:
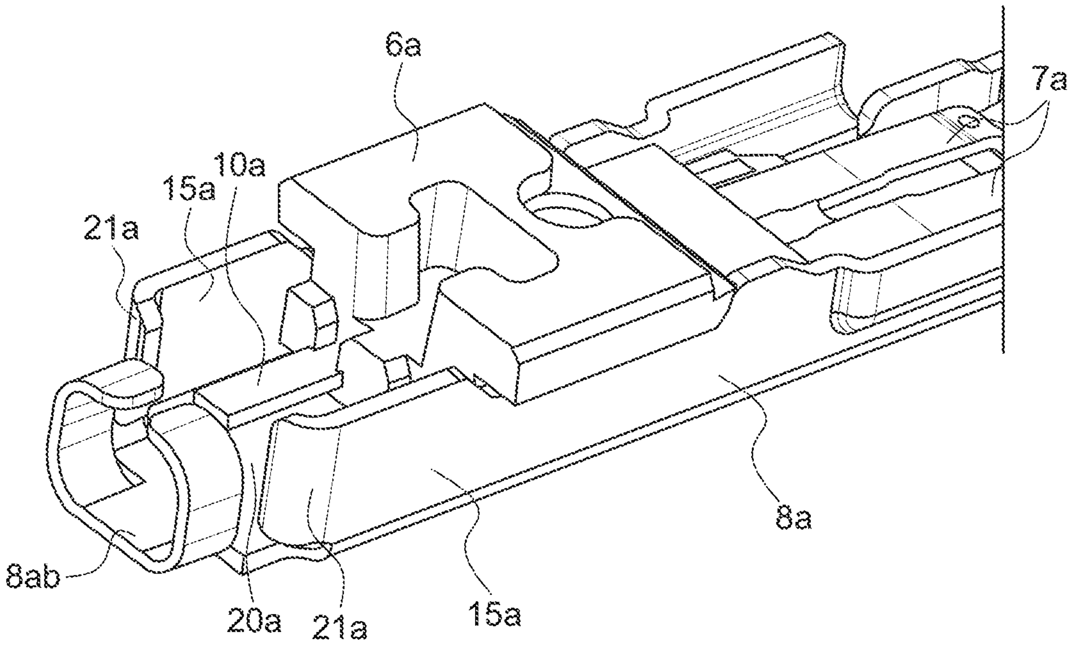
FIG. 18 illustrates an embodiment of the shield and chicklet.

Referring now to FIGS. 16 to 18 there are depicted embodiments that illustrate alternative structures and methods for connecting a shield to a conductor of a cable (e.g., twinax cable) and vice-versa. As shown in FIG. 16, an electrical, conductive grounding collar 5*ab* may be attached (e.g., crimped, soldered, connected with a conductive adhesive) to the shielding layer 13*a* and the drain wire 16 of the cable 5*a*. Thereafter, the inward ends 21*a* of sidewalls of shield 8*a* may be connected (e.g., welded, soldered) to the collar 5*ab* to form a ground path connection (see FIG. 17).

In FIGS. 16 and 17 the collar 5*ab* is illustrated as a separate component. However, in yet another embodiment a collar may be formed as an integral part of a shield. For example, in FIG. 18 a collar 8*ab* is depicted as an integral part of shield 8*a*, for example. The collar 8*ab* of shield 8*a* may be connected (e.g., welded, soldered) to the shielding layer 13*a* of cable 5*a* to form a ground path connection. The collar 8*ab* can also engage the drain wire 16.

Figure 19:
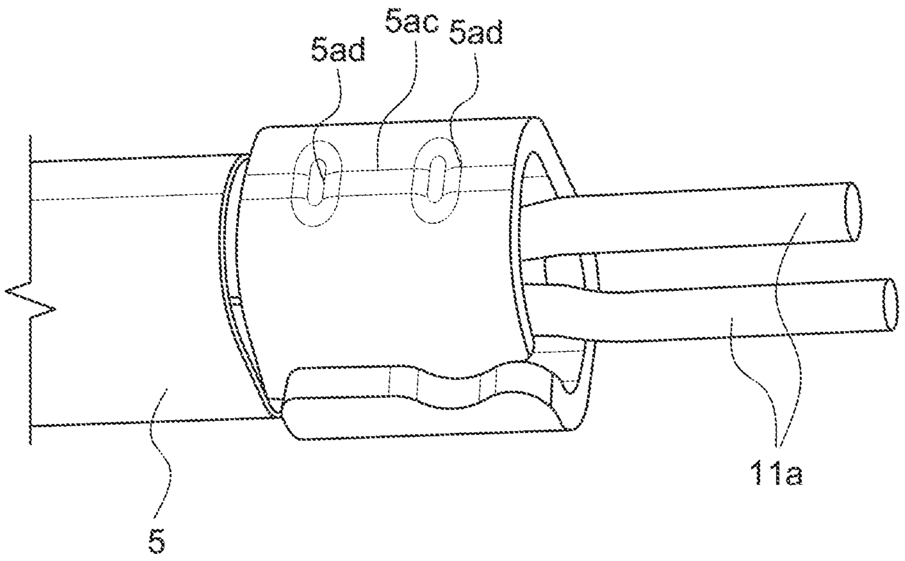
FIGS. 19 to 22 depict embodiments that illustrate additional, alternative structures and methods for connecting a shield to a cable (e.g., twinax cable)
Figure 20:
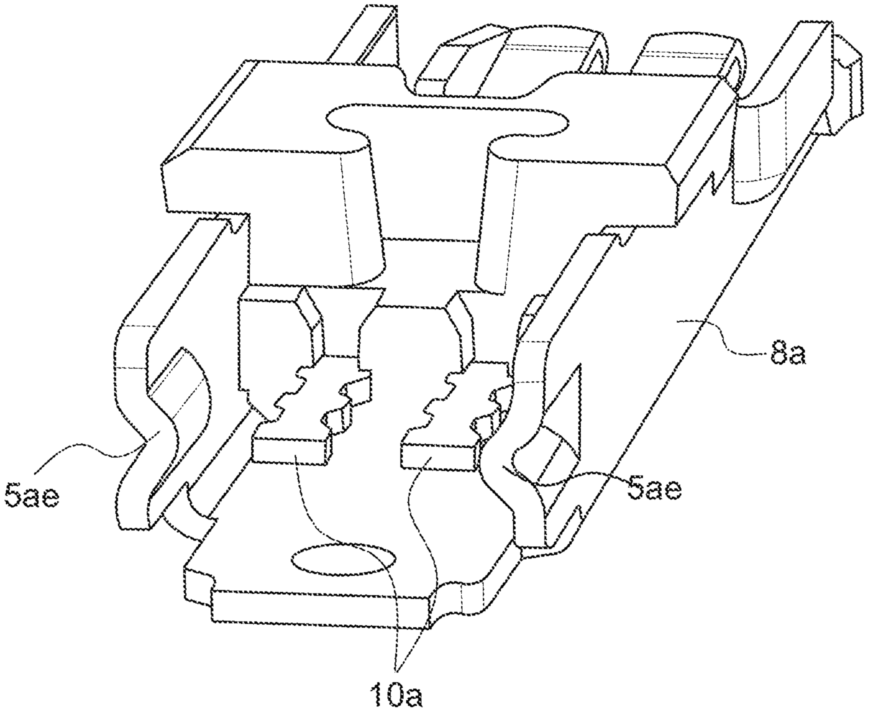
Figure 21:
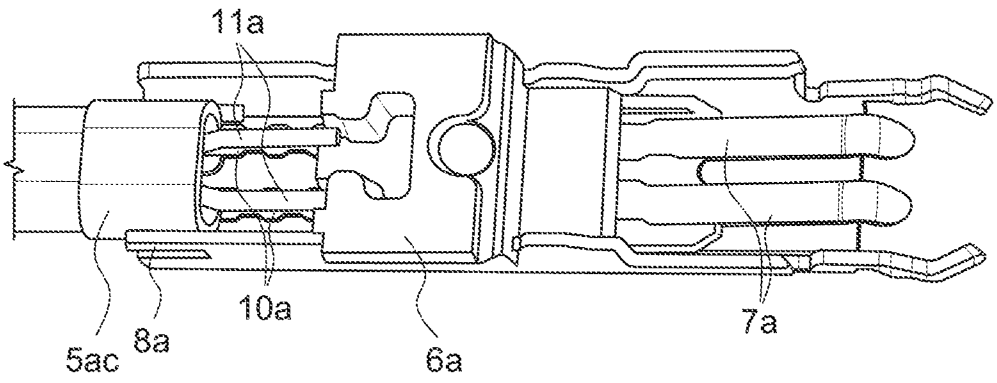
Figure 22:
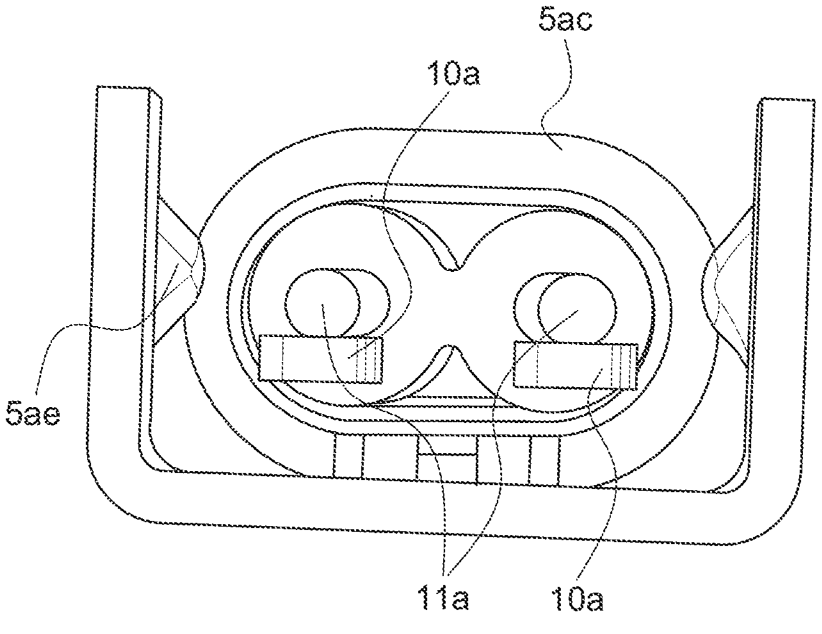

Referring now to FIGS. 19 to 22 there are depicted embodiments that illustrate additional, alternative structures and methods for connecting a shield to a cable (e.g., twinax cable). As shown in FIG. 19, an electrical grounding collar 5*ac* may be connected (e.g., crimped, soldered, connected with a conductive adhesive) to the shield layer 13*a* of a cable 5*a*. Further, in an embodiment, to connect the collar 5*ac* to an exemplary shield 8*a* to complete a grounding path, one or more sets of mated inward protrusions and inward indentations may be used, for example. In the embodiments depicted in FIGS. 19 to 22 the collar 5*ac* may comprise one or more integral indentations 5*ad* while the shield 8*a* may comprise one or more integral inward protrusions 5*ae*, for example, it being understood that this is merely exemplary (e.g., the protrusions may be outward and integral to the collar and the indentations may be outward and integral to the shield). Accordingly, the shield 8*a* may be connected to the collar 5*ac* by applying a force to the shield 8*a* or collar 5*ac* that forces each of the one or more protrusions 5*ae* into at least one of the one or more indentations 5*ad* (or vice-versa). Thereafter, additional connection methodologies may be used to further connect the collar 5*ac* to the shield 8*a* (e.g., soldering, laser welding, or mechanical crimping, conductive adhesive, etc.).

Compared to the collars 5*ab*, 8*ab* shown in FIGS. 16 to 18, the collar 5*ac* may have greater dimensions along its length, for example, than collars 5*ab*, 8*ab* in order to contact a conductor 11*a* over a longer length and larger area of conductor 11*a*. By doing so it is believed that the collar 5*ac* may more securely attach to the conductor 11*a*. Further, by configuring the collar 5*ac* with a longer length (along the axis of the conductor 11*a*) the collar 5*ac* may extend beyond the end of the conductor 11*a* (and its shielding layer 13*a*), thereby providing an electromagnetic, protective "canopy" over the overlapped connection of tails 10*a* to conductors 11*a* that may aid in the reduction of unwanted crosstalk and control the impedance of such a connection.

It is believed that the addition of either collars, 5*ab*, 8*ab* or 5*ac* may increase the structural rigidity of a termination of the cable to the terminals and may provide a favorable surface to help facilitate electrical connection to the shield 8*a*. It should be understood that when a cable (e.g., cables 5*a* or 5*b*) includes a different grounding structure than that shown in FIGS. 14 to 22, such a grounding structure may also be connected to an exemplary shield (e.g., shield 8*a*) of a connector to maintain an electrical ground path.

Figure 23:
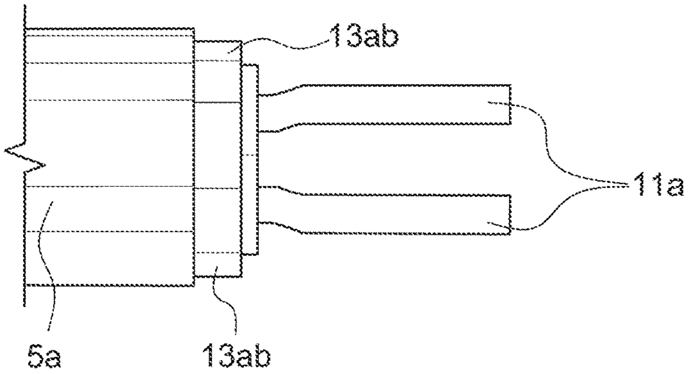
FIGS. 23 to 25 depict the exemplary connection of dual side drain wires of an electrical cable to a shield.
Figure 24:
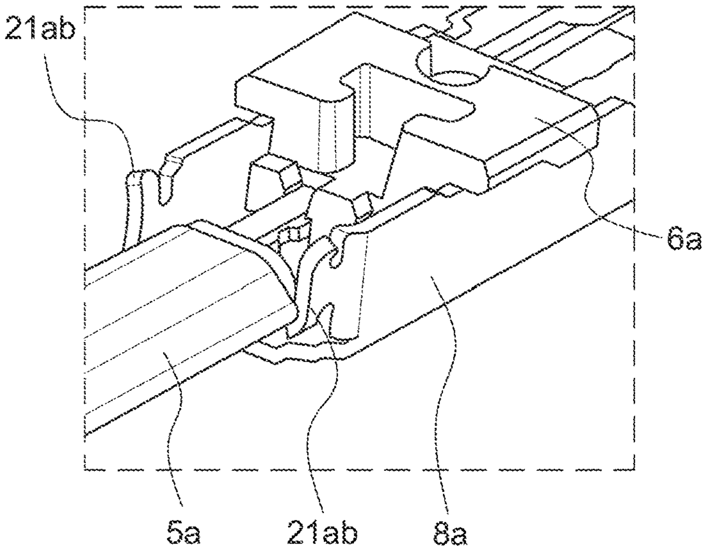
Figure 25:
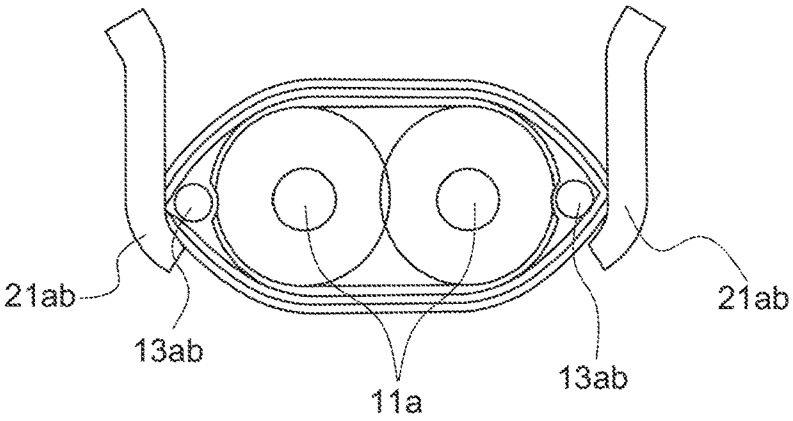

For example, referring now to FIGS. 23 to 25 there is shown an exemplary cable 5*a* with dual, side drain wires 13*ab*. In an embodiment, to electrically and physically connect an exemplary shield 8*a* to the drain wires 13*ab*, the shield 8*a* may include retaining arms 21*ab*, where the retaining arms 21*ab* may be configured as a cradle to make electrical and physical contact with the shield and/or exposed side drain ground wires 13*ab*, as shown in FIGS. 24 and 25. Though each retaining arm 21*ab* may make frictional contact with a drain wire 13*ab* to form a ground path connection between the shield 8*a* of connector 1*a* and cable 5*a*, such a connection may also include solder, laser welds or an adhesive coating to further fix the retaining arm 21*ab* to the corresponding drain wire 13*ab*.

Figure 26:
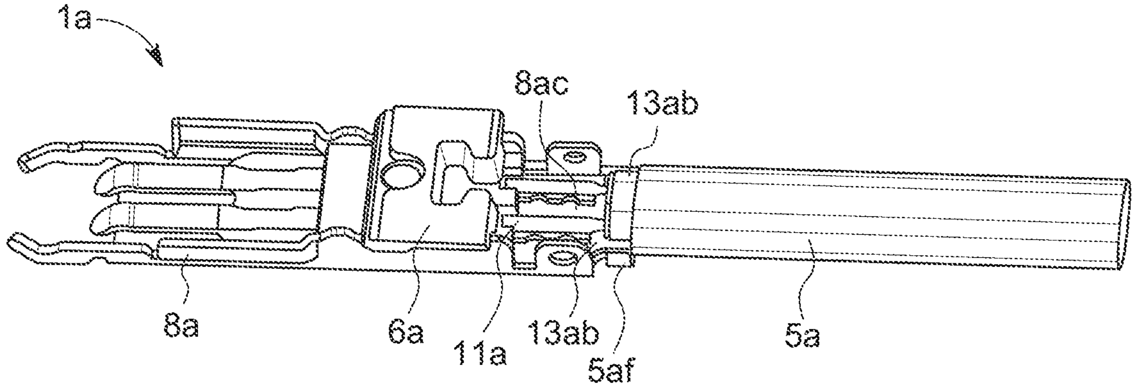
FIGS. 26 to 29 depict embodiments for connecting a cable (e.g., twinax cable) to a shield and tails.
Figure 27:
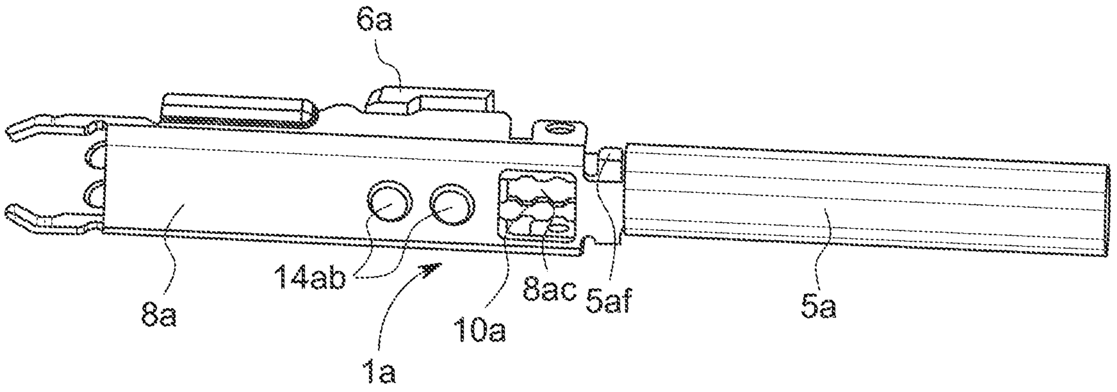
Figure 28:
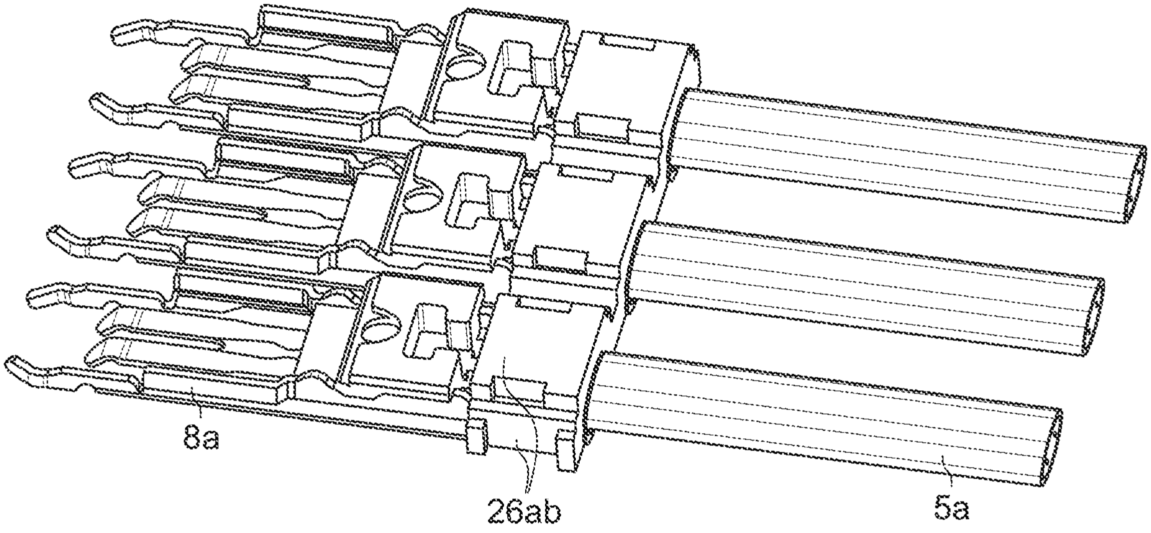
Figure 29:
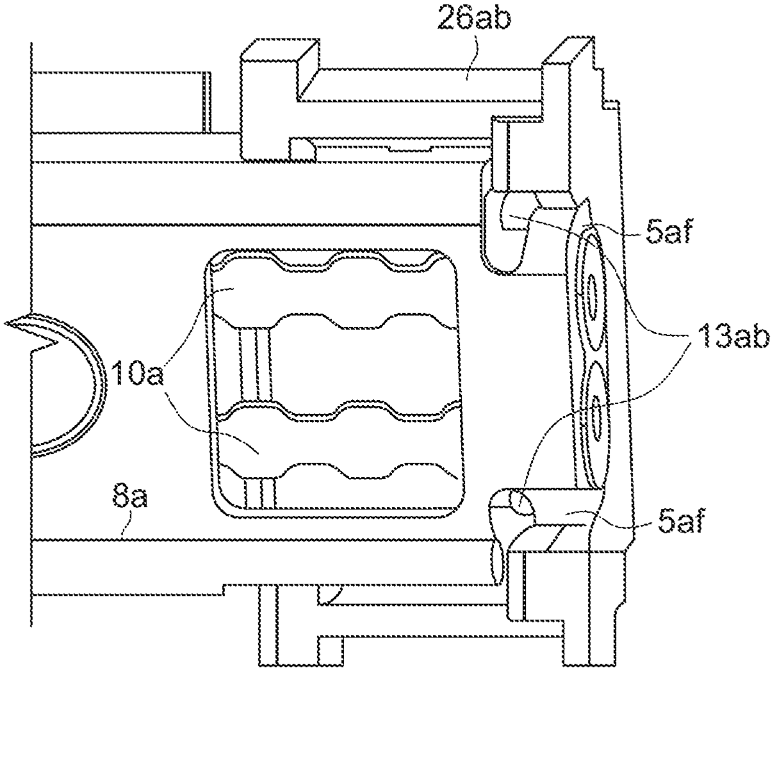

Yet another embodiment for connecting a cable (e.g., twinax cable) to terminals is shown in FIGS. 26 to 29. FIGS. 26 and 27 depict top and bottom views of an exemplary shield 8*a* and exemplary cable 5*a* with dual side drain wires 13*ab*. In an embodiment, to electrically connect tails 10*a* to conductors 11*a* of the cable 5*a*, an exemplary shield 8*a* may be configured with an opening 8*ac*. In an embodiment, the opening 8*ac* may allow the conductors 11*a* to be connected to the tails 10*a* using a resistance welding process, for example. However, the presence of an opening may increase unwanted cross-talk from an adjacent set of terminals. Accordingly, the inventors provide exemplary structures and techniques that may reduce unwanted cross-talk, as illustrated in FIGS. 28 and 29.

As shown, conductive, micro-clamp 26*ab* (made from a conductive plated plastic, for example) may be positioned over the connected tails 10*a* and conductors 11*a* (the later hidden from view) and when aligned with another shield 8*a*, the micro-clamp 26*ab* blocks the opening 8*ac* so as to reduce or mitigate the potential effects of unwanted cross-talk.

In FIG. 29 it can be seen that, in an embodiment, the micro-clamp 26*ab* may be configured to compress the drain wires 13*ab* onto integral tabs 5*af* of the grounded shield 8*a*, for example, to form a ground path.

In an embodiment, the micro-clamp 26*ab* may include a latch mechanism (not shown) to allow the connected tails 10*a* and conductors 11*a* to be accessed via the opening 8*ac* if need be. Further, the micro-clamp 26*ab* may be further secured to the connected tails and/or conductors during a wafer overmolding prices, for example. As can be appreciated, a plurality of micro-clamps can be provided as a single structure that spans across multiple shields.

Figure 30:
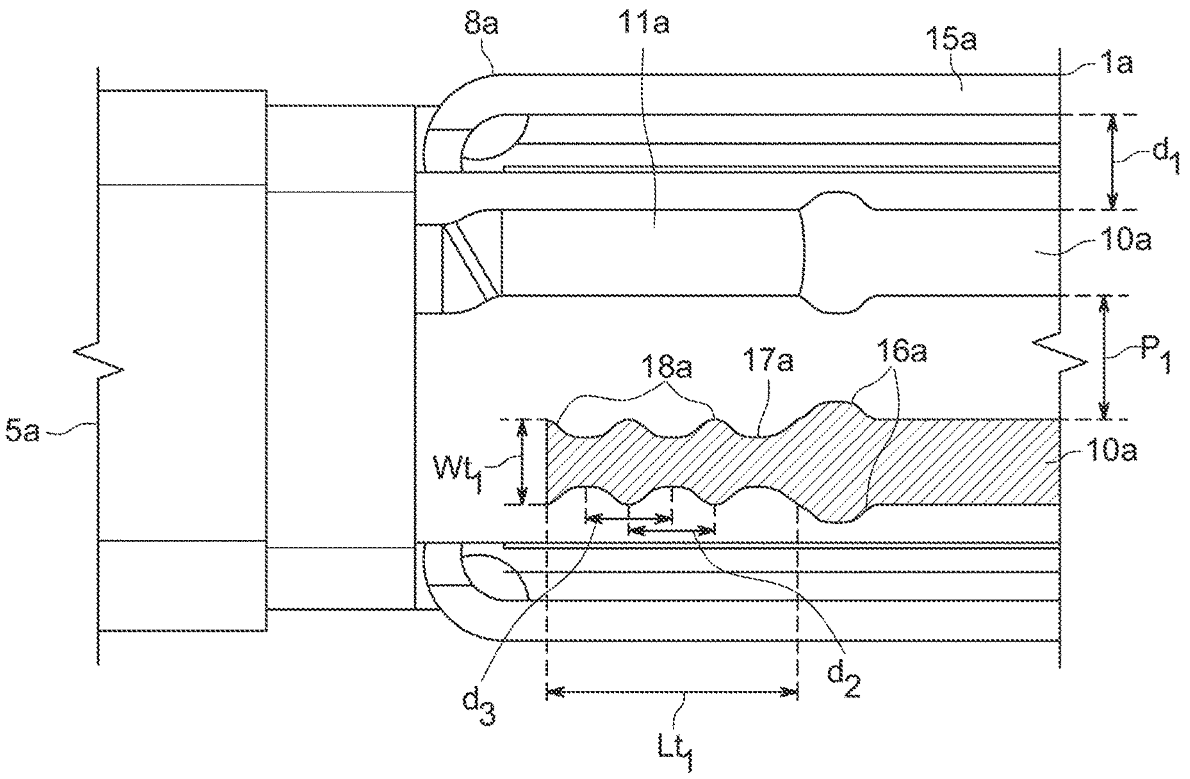
FIG. 30 depicts an enlarged view of an exemplary connection of a cable (e.g., twinax cable) to a shield and tails.

Referring now to FIG. 30, in an embodiment each exemplary tail 10*a* may be configured with one or more undulated edges comprising one or more indentations. As shown, exemplary tail 10*a* may comprise a plurality of undulated edges 16*a*, each edge having one or more indentations 17*a*. Accordingly, the width of the tail, $w_{t1}$, may vary along the connected length, $l_{t1}$, of the tail 10*a* (to provide a so-called "scalloped" tail). The inventors discovered that by varying the width of the tail 10*a* along its connected length $l_{t1}$, the impedance of the connection between the corresponding tail 10*a* and conductor 11*a* may be better controlled. This helps provide a more consistent impedance along the signal path and thus helps improve signal integrity of the system without the need to widen the distance $d_1$ between wall 15*a* of the shield 8*a* and tail 10*a* which may in turn widen the overall distance between opposing walls of the shield 8*a* and, thus, disadvantageously enlarge the area encompassed by the connector 1*a*. Further, varying the width of a tail allows for additional surface area to ensure a reliable connection between the conductor and the tail. Though the scalloped tail 10*a* may comprise "valley" portions 17*a* (i.e., indentations) where its width is narrowed, it also comprises "peak" portions 18*a* where its width is wide enough to allow the tail 10*a* to be connected to the conductor 11*a* (e.g., via welding) to avoid problems associated with variations in the positioning of conductors 11*a* within cable 5*a*, for example.

In sum, it is believed that scalloped tails 10*a* provides sufficient electrical performance for the connection of a tail 10*a* and conductor 11*a* without sacrificing size (of connector 1*a*) or the mechanical integrity of the connection.

In embodiments, the minimum width of a valley portion 17*a* and/or of a peak portion 18*a* may depend on the width of a conductor 11*a* (i.e., wire gauge) that is to be connected (e.g., welded) to the tail 10*a* where the minimum width is about equal to or slightly less than the width of the conductor 11*a*.

While the tail 10*a* shown in the figures comprises the same, uniform width for each valley portion 17*a* and the same, uniform width for each peak portion 18*a* (though the widths of portions 17*a* and 18*a* differ), this is merely exemplary. Alternatively, the width of each valley portion 17*a* may differ from one portion 17*a* to another portion 17*a*. So too may the width of each peak portion 18*a* vary from one peak portion 18*a* to another peak portion 18*a* for a given tail 10*a*. For example, the width of the valley and/or peak portions of a given tail may increase or decrease from portion to portion along the connected length $l_{t1}$, of a tail (e.g., valley and/or peak portions may be wider the closer a portion is to a cable). Still further, the width of respective valley and peak portions may have varying, different widths form portion to portion along the connected length to reduce an impedance of a connection or to otherwise optimize the electrical and/or mechanical reliability of the connection.

Similarly, while the shape of the edges 16*a* of the peak portions 18*a* and valley portions 17*a* in the figures is rounded, this is also merely exemplary. Alternatively, the shape of the edges 16*a* of the valley and/or peak portions 17*a*, 18*a* may be rectangular, diamond-shaped, or another shape that improves the electrical and/or mechanical performance of the connection of a tail to a conductor.

In embodiments, length-wise distances $d_2$ and $d_3$ (i.e., separations), respectively, between the top of each peak portion 18*a* and between the bottom of each valley portion 17*a*, respectively, may be uniformly the same or may vary along the connected length. For example, a distance $d_2$, $d_3$ may gradually increase or decrease along the connected length. Still further a distance $d_2$, $d_3$ may vary from respective portion to respective portion (top of a peak portion 18*a* to top of another peak portion 18*a*, or bottom of a valley portion 17*a* to bottom of another valley portion 17*a*) along the connected length $l_{t1}$, of a tail (e.g., valley and/or peak portions may be wider the closer a portion is to a cable). Still further, the distance $d_2$, $d_3$ between respective tops and bottoms of respective valley and peak portions may vary from one portion to another portion along the connected length (i.e., dissimilar lengths between each top, peak portion and/or dissimilar lengths between each bottom, valley portion) to reduce an impedance of a connection or to otherwise optimize the electrical and/or mechanical reliability of the connection.

Figure 31:
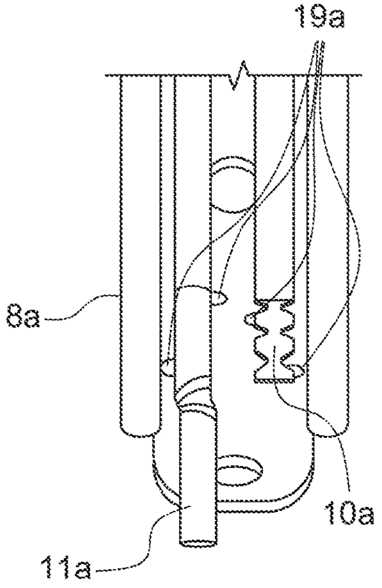
FIG. 31 depicts an exemplary tail with a portion shaped to, among other things, guide a conductor of a cable onto the surface of the tail.

Yet further, one or more of the peak portions of a tail may be shaped or otherwise configured to guide a conductor onto the tail during a connection process. For example, referring to FIG. 31, there is depicted an exemplary tail 10*a* comprising a "hook"—shaped portion 19*a* that is configured to guide the conductor 11*a* onto the surface of the tail 10*a* so as to make alignment of the tail and the conductor easier to manage. Further, such a hook portion 19*a* may also aid in preventing the conductor 11*a* from moving during its connection to tail 10*a* (e.g., welds, overmolding), again resulting in a reliable connection.

Though the components (and their connections) of one connector 1*a* are depicted in FIGS. 9 to 31, it should be understood that connector 1*b* can have the same features as in most cases the connector 1*b* will be a duplicate of connector 1*a* but rotated 180 degrees. Accordingly, as previously indicated connectors 1*a* and 1*b* may be connected together to form a hermaphroditic connector assembly 1*c*.

Figure 32:
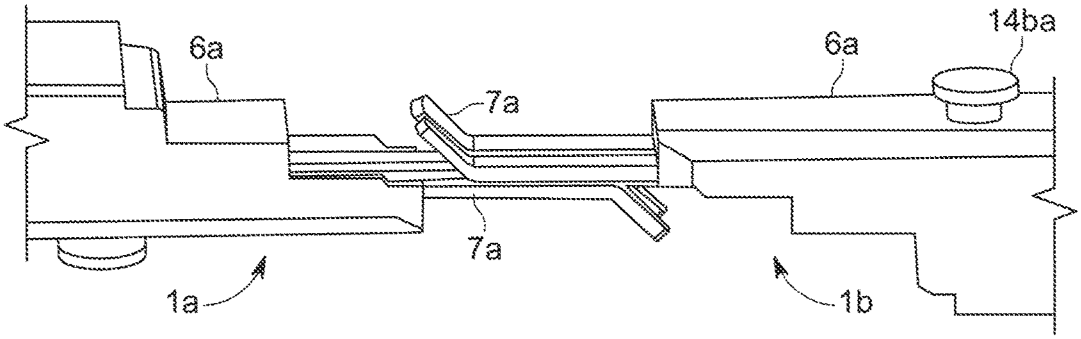
FIGS. 32 to 34 illustrate exemplary views of an exemplary connection of terminals of one connector to terminals of another connector.
Figure 33:
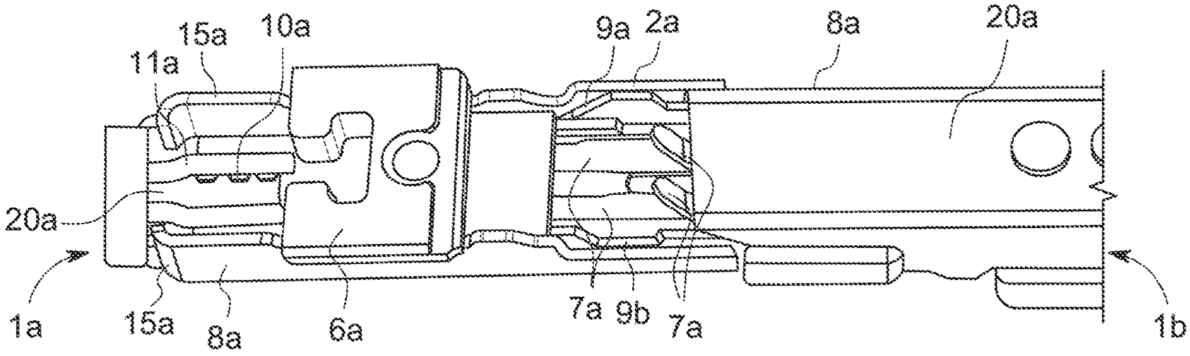
Figure 34:
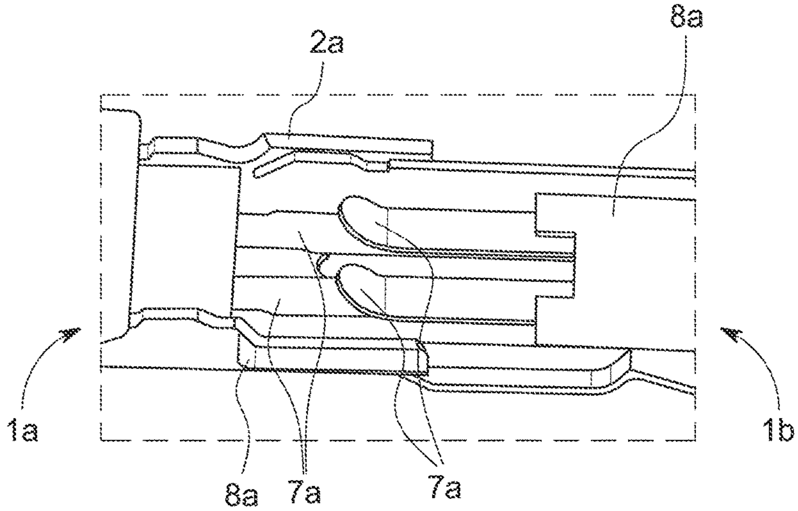

Referring now to FIGS. 32 to 34 there is depicted views of the exemplary connection of terminals 7*a* of a connector 1*a* to terminals 7*a* of a connector 1*b* and an exemplary connection of a shield 8*a* of connector 1*a* to a shield 8*a* of connector 1*b*. Although only one pairs of terminals 7*a* and one respective shield 8*a* of each respective connector 1*a*, 1*b* is shown it should be understood that additional terminals 7*a* and shields 8*a* of the connectors 1*a*, 1*b* may be connected in a similar fashion.

In FIG. 32 the shields 8*a* are not shown in order to illustrate how terminals 7*a* may contact one another to form connected, high-speed signal paths while in FIGS. 33 and 34 the shields 8*a* are shown. In FIG. 34 the shields are shown as being transparent though this is merely illustrative to allow the reader to once again see how the terminals 7*a* may contact with one another to form connected, high-speed signal paths.

In an embodiment, each of the respective terminals 7*a* of connector 1*b* may be overlappingly positioned on top of a terminals 7*a* of connector 1*a* (or vice-versa) as shown in FIGS. 32 to 34 to make physical and electrical contact with conductor 7*a* to form connected, high-speed signal paths. The depicted configuration can provide dual contact points and desirable levels of wipe without providing a large stub, which would be electrically undesirable.

As can be seen in FIG. 33, the conductors 11*a* may be positioned within the shield 8*a*, where each shield 8*a* may comprise a main wall, sidewalls, ends and/or arms that may make physical and electrical contact with each other at points 22, for example, to form (and maintain) an electrical ground path between connectors 1*a*, 1*b*, for example. The shields are thus configured to help control impedance of the connection, coupling between the signal and ground paths and protect the connection from unwanted electromagnetic signals from adjacent or nearby conductors (e.g., crosstalk), for example.

The inventors believe that connectors and connector assemblies described herein may use 75% or less of the space of existing connector/connector assemblies, for example, while enabling the transmission of high-speed, differential signals (e.g. 112 Gbps PAM4 capable and potentially 224 Gbps PAM4) without sacrificing electrical or mechanical performance (e.g., very low crosstalk, tight impedance control, low common mode conversion) and at a lower cost due to a reduction in tooling costs and fewer components versus existing connectors and connector assemblies.

While benefits, advantages, and solutions have been described above with regard to specific embodiments of the present invention, it should be understood that any component(s) that may cause or result in such benefits, advantages, or solutions to become more pronounced are not to be construed as a critical, required, or an essential feature or element of any or all the claims appended to the present disclosure or that result from the present disclosure.

Further, the disclosure provided herein describes features in terms of specific exemplary embodiments. However, numerous additional embodiments and modifications within the scope and spirit of the appended claims will occur to persons of ordinary skill in the art from a review of this disclosure and are intended to be covered by the disclosure and appended claims. Accordingly, this disclosure includes all such additional embodiments, modifications and equivalents of the subject matter recited in the claims appended hereto as permitted by applicable law. Moreover, any combination of the above-described components in all possible variations thereof is encompassed by the disclosure unless otherwise indicated herein or otherwise clearly contradicted by context.

We claim:

1. A hermaphroditic connector assembly, comprising:

a first connector with a first housing and a second connector with a second housing, each of the first housing and the second housing comprising a first engagement feature and second engagement feature wherein the first engagement feature of the first housing is configured to mate with the second engagement feature of the second housing, and the second engagement feature of the first housing is configured to mate with the first engagement feature of the second housing, each of the first connector and the second connector further comprises a plurality of shields that are U-shaped and formed of a conductive material, the plurality of shields positioned in a pocket of the housing, each of the plurality of shields being connected to a shielding layer of a respective cable, and the plurality of shields of the first connector are configured to mate with the plurality of shields of the second connector when the first housing and the second housing are coupled at 180 degrees of rotation relative to each other.

2. The hermaphroditic connector assembly of claim 1, wherein the first engagement feature of the first housing and the first engagement feature of the second housings is configured as a T-shaped rib, and the second engagement feature of the first housing and the second engagement feature of the second housings is configured as a T-shaped slot.

3. The hermaphroditic connector assembly of claim 1, wherein each of the plurality of shields comprises an opening for receiving a connection material to connect the shielding layer of the cable to a respective one of the plurality of shields to form a ground path.

4. The hermaphroditic connector assembly of claim 1, wherein the cable comprises a flat drain wire.

5. The hermaphroditic connector assembly of claim 1, wherein ends of each of the plurality of shields are configured inwardly towards the shielding layer of the cable to provide a surface at which a respective one of the plurality of shields is electrically bonded to the shielding layer.

6. The hermaphroditic connector assembly of claim 1, wherein each of the plurality of shields comprises retaining arms and the cable comprises dual, side drain wires, wherein the retaining arms are configured to engage the dual, side drain wires of the cable.

7. The hermaphroditic connector assembly of claim 1, wherein the pocket comprises a region of air on one side of the plurality of shields.

8. The hermaphroditic connector assembly of claim 1, wherein each of the plurality of shields comprises flexible fingers that are configured to electrically connect to a mating shield.

9. The hermaphroditic connector assembly of claim 1, further comprising a collar aligned with each of the plurality of shields configured to connect a respective one of the plurality of shields to the shielding layer to form a ground path therebetween.

10. The hermaphroditic connector assembly of claim 9, wherein the collar is formed integrally with the respective one of the plurality of shields.

11. The hermaphroditic connector assembly of claim 1, wherein each of the plurality of shields supports a chicklet that, in turn, supports a pair of terminals, each terminal in the pair of terminals comprising a tail, wherein conductors in the cable are connected to the tail of each terminal in the pair of terminals.

12. The hermaphroditic connector assembly of claim 11, wherein each of the plurality of shields comprises a main wall having an opening, and a connection between the tail of each terminal in the pair of terminals and the conductors are accessible in the opening.

13. The hermaphroditic connector assembly of claim 12, further comprising a micro-clamp positioned on each of the plurality of shields so that the micro-clamp is aligned with the opening in the main wall of an adjacent one of the plurality of shields.

14. The hermaphroditic connector assembly of claim 13, wherein the micro-clamp is formed of a conductive polymer material.

15. The hermaphroditic connector assembly of claim 13, wherein the cable comprises dual side drain wires and each of the micro-clamps is configured to compress the dual side drain wires against integral tabs of the corresponding one of the plurality of shields to form a ground path therebetween.

16. The hermaphroditic connector assembly of claim 11, wherein the tails of each terminal in the pair of terminals is configured with an undulated edge comprising one or more indentations.

17. The hermaphroditic connector assembly of claim 16, wherein the assembly is configured to support a 112 Gbps data rate using PAM 4 encoding.

18. A connector assembly, comprising:

a housing with a first engagement feature and a second engagement feature, the housing having a plurality of pockets;

a plurality of shields that are U-shaped and formed of a conductive material and are inserted into the plurality of pockets of the housing, wherein the plurality of shields are configured to mate with respective shields of another connector when the plurality of shields are rotated 180 degrees relative to the respective shields;

a wafer mounted in the housing and supporting the plurality of shields and a plurality of cables extending out of the wafer, wherein each of the plurality of cables has a pair of conductors and a shielding layer, the shielding layer being electrically connected to a corresponding one of the plurality of shields; and a chicklet positioned in each of the plurality of shields, the chicklet supporting a pair of terminals, each terminal in the pair of terminals comprising a tail configured to engage another terminal, wherein each conductor of the pair of conductors are terminated to each tail of the pair of terminals, wherein each of the plurality of shields comprises a main wall having an opening for a connection between each tail of the pair of terminals and the conductors.

19. The connector assembly of claim 18, wherein each of the plurality of cables further comprises a drain wire that is electrically connected to the corresponding one of the plurality of shields.

20. The connector assembly of claim 19, wherein the drain wire is a first drain wire and each of the plurality of cables comprises a second drain wire, the first drain wire and the second drain wire being positioned on opposing sides of the conductors.

21. The connector assembly of claim 20, further comprising a micro-clamp that mounts on at least one of the plurality of shields, and presses the first drain wire and the second drain wires against the at least one of the plurality of shields.

22. The connector assembly of claim 21, wherein the wafer is a first wafer, the housing having a second wafer positioned adjacent the first wafer, wherein one of the micro-clamps in the first wafer is aligned with one of a plurality of openings in the second wafer.

23. A connector assembly, comprising:

a housing with a first engagement feature and a second engagement feature, the housing having a plurality of pockets;

a wafer mounted in the housing and supporting a plurality of shields and a plurality of cables extending out of the wafer, wherein each of the plurality of shields is configured to connect to a corresponding one of a plurality of cables, each of the plurality of cables having a pair of conductors and a shielding layer, the shielding layer electrically connected to a corresponding one of the plurality of shields, and the plurality of shields being positioned in the plurality of pockets;

a chicklet positioned in each of the plurality of shields, the chicklet supporting a pair of terminals, each terminal in the pair of terminals including a tail, each of terminal in the pair of terminals configured to engage a corresponding terminal of another connector, wherein the pair of conductors are terminated to the pair of terminals, wherein each of the plurality of shields comprises a main wall having an opening that is aligned with a location where the tail of the pair of terminals are connected to the pair of conductors;

wherein each of the plurality of cables further comprises a first drain wire and a second drain wire positioned on opposing sides of the pair of conductors, a micro-clamp is mounted on the corresponding one of the plurality of shields that presses the first drain wire and the second drain wire of a corresponding one of the plurality of cables thereagainst, and each of the first drain wire and the second drain wire are electrically connected to a corresponding one of the plurality of shields.

* * * * *